United States Patent
Hashiba et al.

(10) Patent No.: US 7,258,921 B2
(45) Date of Patent: *Aug. 21, 2007

(54) COMPOSITE PARTICLE WITH A CARBODIIMIDE RESIN LAYER AND A PROCESS FOR PRODUCING THE SAME

(75) Inventors: Toshifumi Hashiba, Chiba (JP); Kazutoshi Hayakawa, Chiba (JP); Satomi Kudo, Chiba (JP); Kaori Satoh, Chiba (JP); Takaya Sato, Chiba (JP); Hiroshi Yoshida, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 194 days.

This patent is subject to a terminal disclaimer.

(21) Appl. No.: 10/523,816

(22) PCT Filed: Aug. 7, 2003

(86) PCT No.: PCT/JP03/10061

§ 371 (c)(1),
(2), (4) Date: Feb. 4, 2005

(87) PCT Pub. No.: WO2004/014988

PCT Pub. Date: Feb. 19, 2004

(65) Prior Publication Data

US 2005/0271875 A1 Dec. 8, 2005

(30) Foreign Application Priority Data

Aug. 9, 2002 (JP) ............................. 2002-233635

(51) Int. Cl.
B32B 5/66 (2006.01)
(52) U.S. Cl. ...................... 428/402; 428/403; 428/407; 427/384
(58) Field of Classification Search ................ 428/402, 428/403, 407; 427/384
See application file for complete search history.

(56) References Cited

U.S. PATENT DOCUMENTS

| 5,958,516 | A | 9/1999 | Imashiro et al. | |
| 6,127,029 | A | 10/2000 | Imashiro et al. | |
| 6,127,477 | A | 10/2000 | Imashiro et al. | |
| 6,866,934 | B2 * | 3/2005 | Takahashi et al. | 428/402 |
| 2005/0118424 | A1 | 6/2005 | Takahashi et al. | |
| 2006/0052549 | A1 | 3/2006 | Hashiba et al. | |

FOREIGN PATENT DOCUMENTS

| EP | 0 878 496 A1 | 11/1998 |
| JP | 43-15689 | 7/1968 |
| JP | 43-15689 B1 | 7/1968 |
| JP | 63-116695 | 5/1988 |
| JP | 2-8272 | 1/1990 |
| JP | 4-21637 | 1/1992 |
| JP | 04-021637 | 1/1992 |
| JP | 07-179613 A | 7/1995 |
| JP | 10-030024 | 2/1998 |
| JP | 10-30024 | 2/1998 |
| JP | 10-60272 | 3/1998 |
| JP | 10-060272 | 3/1998 |
| JP | 2000-119539 | 4/2000 |
| JP | 2000-119539 A | 4/2000 |
| JP | 2000-155441 | 6/2000 |
| JP | 2001-66304 | 3/2001 |
| JP | 2001-66304 A | 3/2001 |
| JP | 2001-342377 A | 12/2001 |
| JP | 2002-201286 | 7/2002 |
| JP | 2002-201286 A | 7/2002 |
| JP | 2003-268118 * | 9/2003 |
| JP | 2003-268118 A | 9/2003 |
| WO | WO 01/70826 A1 | 9/2001 |
| WO | WO 01/89592 A2 | 11/2001 |
| WO | WO 01/91815 A2 | 12/2001 |

* cited by examiner

*Primary Examiner*—Leszek Kiliman
(74) *Attorney, Agent, or Firm*—Westerman, Hattori, Daniels & Adrian, LLP.

(57) ABSTRACT

A composite particle that can be easily converted to cured particle or half cured particle by the use of carbodiimide resin without changing of the configuration of matrix particle of, for example a thermoplastic resin, excelling in mechanical and functional characteristics by virtue of the reaction capability inherently possessed by a carbodiimide group. In particular, a composite particle comprising matrix particle (A) having a functional group capable of reacting with a carbodiimide group and carbodiimide resin (B), characterized in that the functional group of the matrix particle (A) couples with the carbodiimide group of the carbodiimide resin (B) and that the composite particle is provided with an outer shell layer of carbodiimide resin (B) having an average thickness diameter (L), defined by the following formula [1], ranging from 0.01 to 20 μm: $L=(L_2-L_1)/2$ [1] wherein L1 represents the average diameter of matrix particle, and L2 represents the average diameter of composite particle.

11 Claims, 1 Drawing Sheet

1. A shell layer comprising of a carbodiimide resin (B)

2. A core particle derived from a base particle (A)

COMPOSITE PARTICLE WITH A CARBODIIMIDE RESIN LAYER AND A PROCESS FOR PRODUCING THE SAME

BACKGROUND OF THE INVENTION

1. Field of the Invention

The present invention relates to a composite particle with a shell layer that is a carbodiimide resin layer, and a process for producing the same, more particularly a composite particle with a shell layer that is a carbodiimide resin layer comprising a base particle (A) having a functional group and a carbodiimide resin (B), characterized that the shell layer comprising a carbodiimide resin is formed to cover surface of the base particle (A) by bonding between functional groups of the base particle (A) and carbodiimide groups of the carbodiimide resin (B), and a process for producing the same.

2. Description of the Prior Art

A carbodiimide compound (or a carbodiimide resin), having structure of —N=C=N—, has been widely used as a stabilizer for improving hydrolysis resistance for compounds having an ester group or crosslinking agent for resins, e.g., (meth)acrylic resins, having a carboxyl group reactive with a carbodiimide group, where high reactivity of a carbodiimide group is generally utilized.

Various applicable areas have been proposed for carbodiimide resins, e.g., paints, adhesives and coating agents, as disclosed by Japanese Patent Application Laid-Open Nos.10-60272 and 10-30024, and they have been already commercialized in these areas.

However, most of the resins to be crosslinked with a carbodiimide-containing composition are in the form of a molten resin solution, paste or emulsion. Hardening of solid particles themselves requires a great deal of time and is hence difficult.

Production of polyolefin-based resin particles of crosslinked structure by the reaction with a carbodiimide compound in a melting/kneading machine or the like has been studied, as disclosed by, e.g., Japanese Patent Application Laid-Open No.2000-155441. However, the particles which can sufficiently satisfy resistance to heat and chemicals and sufficiently utilized own reaction performance of a carbodiimide resin have not been developed.

Broadly speaking, the processes for producing polymer particles fall into two general categories; (I) production of the objective particles by crushing and classifying the resin produced by, e.g., mass or solution polymerization, as known, and (II) production of adequate (spherical) particles during a polymerization stage, e.g., suspension, emulsion, dispersion or dropping polymerization, or seed processes based on these processes.

When hardened particles are to be produced, most of these approaches incorporate a crosslinkable vinyl-based monomer or polymer to improve resistance to heat and chemicals, or incorporate a crosslinkable monomer or polymer other than a vinyl-based one, e.g., an epoxy resin or the like, to improve resistance to heat and solvents.

In these cases, various particles have been practically used as satisfying resistance to heat and chemicals such as in spacers for liquid crystals, reinforcing materials, modifiers, and the like, however, there have been no particles by applying a carbodiimide resin and satisfy resistance to heat and chemicals.

Further, there are such particles found as having a reactive group such as a carboxyl group, a hydroxyl group, an amino group, and the like by applying a seed polymerization process, and the like, however, they are not sufficient to easily react with such resins with high level of reactive groups such as a carboxyl group, a hydroxyl group, an amino group, and the like as in a (meth)acrylic resin and thus there have been no practical attainment of particles providing sufficient utilization of reactive performance and with good mechanical and functional characteristics.

SUMMARY OF THE INVENTION

Therefore, it is an object of the present invention to easily enable to alter a particle to a hardened particle or a semi-hardened particle without deformation of morphology of a base particle such as a thermoplastic resin using a carbodiimide resin as a hardening agent for a particle and further to provide a composite particle superior in mechanical and functional characteristics by utilization of own reactive performance of a carbodiimide group. "Hardening" in the present specification means to cure a resin by crosslinking and the like and reduce thermoplastic nature to stabilize property.

The inventors of the present invention have found, after having extensively studied to solve the problems involved in the conventional techniques, that such a base particle is obtained as has a layer of a carbodiimide resin at the surface of a base particle by mixing and reaction between a carbodiimide resin and a base particle such as a thermoplastic resin having a group reactable with a carbodiimide group (for example, a hydroxyl group, an amino group, a carboxyl group, a thiol group, and the like) in the presence of water or an organic solvent which is poor solvent for a base particle but good solvent for a carbodiimide resin, and that a composite particle thus obtained has superior mechanical and functional characteristics due to bonding between a base particle and a carbodiimide resin layer. The present invention is developed based on the above knowledge.

The first aspect of the present invention provides a composite particle comprised of a base particle (A) having a functional group reactable with a carbodiimide group and a carbodiimide resin (B), characterized in that the functional group of the base particle (A) and the carbodiimide group of the carbodiimide resin (B) bond each other, and a shell layer is formed which is comprised of the carbodiimide resin (B) having average thickness diameter (L), represented by the following numerical equation [1], in the range of 0.01 to 20 μm:

$$L=(L_2-L_1)/2 \qquad [1]$$

(wherein $L_1$ represents average particle diameter of the base particle and $L_2$ represents average particle diameter of the composite particle).

The second aspect of the present invention provides the composite particle of the first aspect, wherein the base particle (A) is morphologically truly or nearly spherical.

The third aspect of the present invention provides the composite particle of the first aspect, characterized in that at least one carbodiimide group in a molecular chain of the above-described carbodiimide resin (B) bonds with the functional group of the base particle (A) to form a shell layer.

The fourth aspect of the present invention provides the composite particle of the first aspect, characterized in that the bond of the functional group of the above-described base particle (A) and the carbodiimide group of the carbodiimide resin (B) is at least one kind selected from a carbamoyl amide bond, an isourea bond, a guanidine bond or a thiourea bond.

The fifth aspect of the present invention provides the composite particle of the first aspect, characterized by that the functional group of the base particle (A) is at least one type of an active hydrogen group selected from the group consisting of hydroxyl, carboxyl, amino and thiol groups.

The sixth aspect of the present invention provides the composite particle of the first aspect, characterized in that the above-described base particle (A) is a thermoplastic resin.

The seventh aspect of the present invention provides the composite particle of the first aspect, characterized by that the carbodiimide resin (B) is a carbodiimide resin represented by the following chemical formula (1):

$$R^1-Y-(R^2-N=C=N)_n-R^2-Y-R^3 \qquad (1)$$

(wherein $R^1$ and $R^3$ represent hydrogen or an organic residue having a carbon number of 1 to 40, which is obtained from a compound having a functional group reactable with an isocyanate group left by the functional group, and may be the same or different, and $R^2$ represents an organic residue which is a diisocyanate left by the isocyanate group, wherein said diisocyanate may be a different type. Y represents a bond formed by the above-described isocyanate group and the above-described functional group reactable with the above-described isocyanate group, and "n" is average degree of polymerization, being in the range of 1 to 100. And $R^1-Y$ and $Y-R^3$ may be an isocyanate group itself on the way to carbodiimidation.)

The eighth aspect of the present invention provides the composite particle of the seventh aspect, characterized by that the carbodiimide resin has at least one kind of hydrophilic segment and is soluble in water.

The ninth aspect of the present invention provides a process for producing the composite particle of any one of the first aspect to the eighth aspect, characterized by comprising two steps: the first step in which the base particle (A) having a functional group reactable with a carbodiimide group and a carbodiimide resin (B) are mixed or immersed in the presence of at least one type of a solvent which dissolves (B) but not (A), selected from water and organic compounds, so that the latter is impregnated in the surface layer section of the former; and the subsequent second step in which the shell layer consisting of a carbodiimide resin (B) is formed to cover the surface of the base particle (A) by reaction between functional groups of the base particle (A) and carbodiimide groups of the carbodiimide resin (B).

The tenth aspect of the present invention provides the process for producing the composite particle of the ninth aspect, characterized by the base particle (A) is the one prepared beforehand by suspension, emulsion, dispersion or seed polymerization.

The 11$^{th}$ aspect of the present invention provides the process for producing the composite particle of the ninth aspect, characterized in the first step of the ninth aspect that the base particle (A) is immersed in a solution which is obtained by dissolving the carbodiimide resin (B) in at least one kind of a solvent selected from an organic solvent or water.

The present invention relates to a composite particle composed of a base particle (A) with a functional group reactable with a carbodiimide group and a carbodiimide resin (B), characterized by forming a shell layer consisting of the carbodiimide resin (B) with average thickness diameter (L) in the range from 0.01 to 20 μm by bonding between a functional group of the base particle (A) and a carbodiimide group of the carbodiimide resin (B), and a process for producing the same and preferable aspects thereof include the following:

(1) A composite particle of the first aspect of the present invention, characterized by having core/shell structure.

(2) A composite particle of the first aspect of the present invention, characterized that average particle diameter of said base particle (A) is from 0.01 to 10,000 μm.

(3) A composite particle of the first aspect of the present invention, characterized that said base particle (A) has from 30 to 2000 equivalents of functional groups.

(4) A composite particle of the first aspect of the present invention, characterized that a composite particle is a hardened reactive particle or a semi-hardened particle.

(5) A composite particle of the first aspect of the present invention, characterized that said carbodiimide resin (B) has in the molecular chain at least one bonding group selected from a urethane bonding, a thiourethane bonding, a urea bonding, an amide bonding or a carbodiimide bonding.

(6) A composite particle of the first aspect of the present invention, characterized by having at least one characteristics selected from heat resistance, solvent resistance, chemical resistance, glueability, tackiness, adhesion or dispersibility in a solution.

(7) A composite particle of the sixth aspect of the present invention, characterized that said thermoplastic resin is any one of a styrene based polymer, a (meth)acryl based polymer, a copolymer by addition polymerization of other vinyl based polymer, a polymer by hydrogen transfer polymerization, a polymer by polycondensation or a polymer by addition condensation.

(8) A composite particle of the seventh aspect of the present invention, characterized that said carbodiimide resin (B) has from 50 to 1000 equivalents of carbodiimide (—NCN—) groups.

(9) A composite particle of the seventh aspect of the present invention, characterized that said a carbodiimide resin (B) has average molecular weight from 200 to 100,000.

(10) A composite particle of the eighth aspect of the present invention, characterized that in said hydrophilic segment of said chemical formula (1), $R^1$ or $R^3$ is at least one type of a residue group represented by the following chemical formula from (2) to (5):

(i) a residue of an alkylsulfonate salt having at least one reactive hydroxyl group, represented by:

$$R^5-SO_3-R^4-OH \qquad (2)$$

(wherein, $R^4$ is an alkylene group of 1 to 10 carbon atoms; and $R^5$ is an alkali metal), (ii) a quaternary salt of a dialkylamino alcohol residue represented by:

$$(R^6)_2-NR'-R^7-OH \qquad (3)$$

(wherein, $R^6$ is a lower alkyl group of 1 to 4 carbon atoms; $R^7$ is an alkylene or oxyalkylene group of 1 to 10 carbon atoms; and R' is a group derived from an agent for producing a quaternary salt), (iii) a quaternary salt of a dialkylaminoalkyl amine residue represented by:

$$(R^6)_2-NR'-R^7-NH_2 \qquad (4)$$

(wherein, $R^6$, $R^7$ and R' are each the same as the corresponding one in the formula (3)), and (iv) a poly(alkylene oxide) residue sealed with an alkoxy group at the terminals, having at least one reactive hydroxyl group, represented by:

$$R^8-(O-CHR^9-CH_2)_m-OH \quad (5)$$

(wherein, $R^8$ is a lower alkyl group of 1 to 4 carbon atoms; $R^9$ is a hydrogen atom or methyl group; and "m" is an integer of 2 to 30).

(11) A process for producing a composite particle of the ninth aspect of the present invention, characterized that morphology of said base particle (A) is true spherical or nearly spherical.

(12) A process for producing a composite particle of the ninth aspect of the present invention, characterized that said base particle (A) is a thermoplastic resin.

(13) A process for producing a composite particle of the above (12) aspect of the present invention, characterized that said thermoplastic resin is any one of a styrene-based polymer, a (meth)acrylate-based polymer, a copolymer by addition polymerization of other vinyl-based polymer, a polymer by hydrogen transfer polymerization, a polymer by polycondensation or a polymer by addition condensation.

(14) A process for producing a composite particle of the ninth aspect of the present invention, characterized that in mixing ratio of a base particle (A) and a carbodiimide resin (B), carbodiimide groups of the carbodiimide resin (B) is from 0.1 to 20 equivalents based on 1 equivalent of a functional group of the base particle (A).

(15) A process for producing a composite particle of the ninth aspect of the present invention, characterized that a functional group of said base particle (A) is at least one activated hydrogen group selected from an hydroxyl group, a carboxyl group, an amino group or a thiol group.

(16) A process for producing a composite particle of the ninth aspect of the present invention, characterized that said carbodiimide resin (B) has average molecular weight from 200 to 100,000.

(17) A process for producing a composite particle of the ninth aspect of the present invention, characterized that a carbodiimide resin (B) has at least one type of a hydrophilic segment and is soluble in water.

(18) A process for producing a composite particle of the above (17) aspect of the present invention, characterized that in said hydrophilic segment in said chemical formula (1), $R^1$ or $R^3$ is at least one type of a residue group represented by the above chemical formulae from (2) to (5).

(19) A process for producing a composite particle of the ninth aspect of the present invention, characterized that said solvent is at least one of water, water-lower alcohol mixture or toluene.

(20) A process for producing a composite particle of the ninth aspect of the present invention, characterized that said solvent is at least one type of an organic solvent selected from dimethylformamide (DMF), tetrahydrofuran (THF), methyl ethyl ketone (MEK), methyl isobutyl ketone (MIBK), acetone, N-methyl-2-pyrolidone (NMP), dichloromethane or tetrachloroethylene, or a mixture of water and at least one type of a hydrophilic solvent selected from dimethylformamide (DMF), tetrahydrofuran (THF), acetone, or N-methyl-2-pyrolidone (NMP).

(21) A process for producing a composite particle of the ninth aspect of the present invention, characterized that in the first step, at least one type of compound selected from a dispersing agent, an antioxidant, a stabilizer or an emulsifier is further added other than a base particle (A) and a carbodiimide resin (B).

(22) A process for producing a composite particle of the ninth aspect of the present invention, characterized that in the second step, reaction temperature is from 10 to 200° C.

(23) A process for producing a composite particle of the ninth aspect of the present invention, characterized that in the second step, reaction time is from 1 to 24 hours.

(24) A process for producing a composite particle of the 11$^{th}$ aspect of the present invention, characterized that solution concentration of a carbodiimide resin (B) is from 5 to 60% by weight, when calculated by the next calculation equation:

Solution concentration (% by weight)=100×(total solution−solvent)/total solution

(25) A crosslinking agent, a stabilizer for improving hydrolysis resistance, a thermoplastic resin-hardening agent, an adhesive agent, a coating material or paint, or a spacer of liquid crystal consisting of using a composite particle of any one of from 1 to 8 aspects of the present invention.

Figure 1:
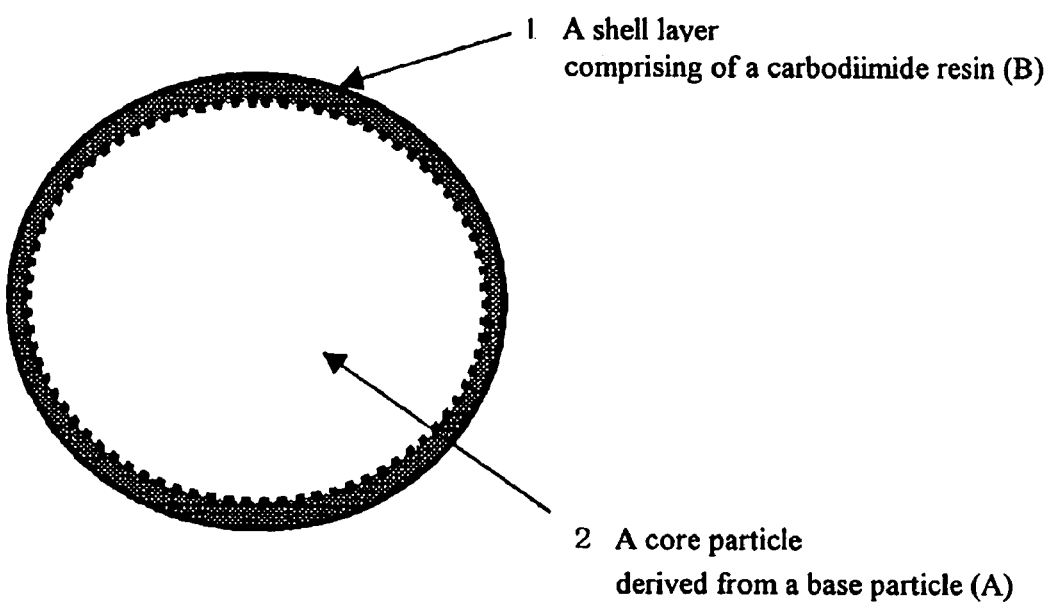
FIG. 1 is a schematic view of a composite particle.

NOTATION 1. a shell layer comprising of a carbodiimide resin (B)
2. a core particle derived from a base particle (A)

DETAILED DESCRIPTION OF THE INVENTION

The present invention is described below in detail for each item.

1. A Composite Particle

A composite particle of the present invention comprising a base particle (A) having a functional group reactable with a carbodiimide group and a shell layer of a carbodiimide resin (B) formed at the surface parts of the base particle (A), and characterized that the base particle (A) and the carbodiimide resin (B) bond via functional groups of the former and a part of carbodiimide groups of the latter to form a shell layer consisting of the carbodiimide resin (B) at the surface of the base particle (A) so that it covers the base particle (A), wherein average thickness diameter (L) expressed by the following numerical equation is in the range from 0.01 to 20 μm:

$$L=(L_2-L_1)/2 \quad [1]$$

(wherein $L_1$ and $L_2$ are average particle diameters of a base particle and a composite particle, respectively).

The composite particle has conceptual structure as shown in FIG. 1.

In FIG. 1, inside a dotted line represents a core particle derived from a base particle (A) and surface layer part represents a shell layer consisting of a carbodiimide resin (B), and thus, presenting a non-spherical or spherical particle with core/shell structure.

A part of carbodiimide groups of a carbodiimide resin (B) forming a shell layer, that is, a layer of this carbodiimide resin, bonds to reactive groups of a base particle (A) by reaction. In this case, at least one carbodiimide group in a molecule bonds to inside or surface of the core particle, which can further improve function such as resistances to heat, chemicals and solvent, and glueability, etc.

When a base particle (A) is a particle of a thermoplastic resin, it is possible to cure inside area, with a shell layer consisting of a carbodiimide resin left as it is at the surface or only surface of the base particle (A), depending on types of a carbodiimide resin.

Further, depending on types of a carbodiimide resin, many carbodiimide groups can be furnished at the surface of a base particle (A) as appropriate, and also can freely control thickness of a shell layer.

A composite particle may be hardened or semi-hardened.

2. A Carbodiimide Resin (B)

A carbodiimide resin (B) for a composite particle of the present invention is a carbodiimide resin (or polycarbodiimide resin) represented by the following chemical formula (1):

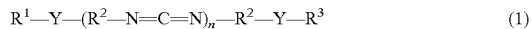

$$R^1-Y-(R^2-N=C=N)_n-R^2-Y-R^3 \quad (1)$$

(wherein, $R^1$ and $R^3$ are each hydrogen or an organic residue of 1 to 40 carbon atoms, which is a compound having a functional group reactive with an isocyanate group left by the functional group, and may be the same or different; $R^2$ is an organic residue which is a diisocyanate left by an isocyanate group, where the diisocyanates may be different; Y is a bond formed by isocyanate group and a functional group reactive with an isocyanate group; "n" is an integer of 1 to 100, representing average degree of polymerization; and each of $R^1$—Y and Y—$R^3$ may be an isocyanate group halfway in the reaction to be converted into the carbodiimide).

In more detail, $R^1$ or $R^3$ in the general formula (1) is at least one type of segment composed of a residue represented by a compound having a functional group or a bond reactive with an isocyanate group.

The representative examples of the functional group or bond include:
(a) hydroxide group —OH (including $H_2O$)
(b) mercapto group —SH
(c) amino group —$NH_2$
(d) carboxyl group —COOH
(e) isocyanate group —NCO
(f) urethane bond —NHCOO—
(g) urea bond —NHCONH—
(h) amide bond —NHCO—
(i) carbodiimide bond —NCN—
(j) dimerized isocyanate bond

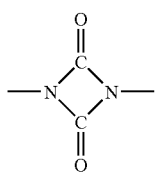

More specifically, the representative compounds reactive with isocyanate group include:

(a) compounds containing a hydroxyl group (—OH): (i) monovalent alcohols, e.g., methyl alcohol, ethyl alcohol, propyl alcohol, isopropyl alcohol, n-butyl alcohol, sec-butyl alcohol and tert-butyl alcohol; (ii) saturated or unsaturated glycols, e.g., ethylene glycol, propylene glycol, trimethylol propane, pentaerythritol, 1,2-propanediol, 1,3-propanediol, 1,3-butanediol, 1,4-butanediol, neopentyl glycol, pentanediol, hexanediol, octanediol, 1,4-butenediol, diethylene glycol, triethylene glycol and dipropylene glycol; (iii) cellosolve; e.g., methyl cellosolve, ethyl cellosolve and butyl cellosolve; (iv) (meth)acryl-based monomers, e.g., 2-hydroxyethyl (meth)acrylate, 2-hydroxypropyl (meth)acrylate, 3-hydroxypropyl (meth)acrylate and 4-hydroxybutyl (meth)acrylate; (v) polyalkylene glycol (meth)acryl-based compounds, e.g., polyethylene glycol mono(meth)acrylate and polypropylene glycol mono(meth)acrylate; (vi) various types of hydroxyalkyl vinyl ethers, e.g., hydroxyethyl vinyl ether and hydroxybutyl vinyl ether; (vii) various allyl compounds, e.g., allyl alcohol and 2-hydroxyethyl allyl ether; (viii) alkyl glycidyl ethers, e.g., n-butyl glycidyl ether and 2-ethylhexyl glycidyl ether; and (ix) high-molecular-weight compounds containing a hydroxyl group, e.g., polyethylene glycol and polypropylene glycol (these compounds may be used either individually or in combination);

(b) compounds containing a mercapto group: (i) aliphatic alkyl mono-functional thiols, e.g., methanethiol, ethanethiol, n- and iso-propanethiol, n- and iso-butanethiol, pentanethiol, hexanethiol, heptanethiol, octanethiol, nonanethiol, decanethiol and cyclohexanethiol; (ii) aliphatic thiols having a heterocyclic ring, e.g., 1,4-dithian-2-thiol, 2-(1-mercaptomethyl)-1,4-dithian, 2-(1-mercaptoethyl)-1,4-dithian, 2-(1-mercaptopropyl)-1,4-dithian, 2-(mercaptobutyl)-1,4-dithian, tetrahydrothiophene-2-thiol, tetrahydrothiophene-3-thiol, pyrrolidine-2-thiol, pyrrolidine-3-thiol, tetrahydrofuran-2-thiol, tetrahydrofuran-3-thiol, piperidine-2-thiol, piperidine-3-thiol and piperidine-4-thiol; (iii) aliphatic thiols having a hydroxy group, e.g., 2-mercaptoethanol, 3-mercaptopropanol and thioglycerol; (iv) compounds having an unsaturated double bond, e.g., 2-mercaptoethyl (meth)acrylate, 2-mercapto-1-carboxyethyl (meth)acrylate, N-(2-mercaptoethyl)acrylamide, N-(2-mercapto-1-carboxyethyl) acrylamide, N-(2-mercaptoethyl)methacrylamide, N-(4-mercaptophenyl)acrylamide, N-(7-mercaptonaphthyl) acrylamide and mono-2-mercaptoethylamide maleate; (v) aliphatic dithiols, e.g., 1,2-ethanedithiol, 1,3-propanedithiol, 1,4-butanedithiol, 1,6-hexanedithiol, 1,8-octanedithiol, 1,2-cyclohexanedithiol, ethylene glycol bisthioglycolate, ethylene glycol bisthiopropionate, butanediol bisthioglycolate, butanediol bisthiopropionate, trimethylolpropane tristhioglycolate, trimethylolpropane tristhiopropionate, pentaerythritol tetrakisthioglycolate, pentaerythritol tetrakisthiopropionate, tris(2-mercaptoethyl)isocyanurate and tris (3-mercaptopropyl)isocyanurate; (vi) aromatic dithiols, e.g., 1,2-benzenedithiol, 1,4-benzenedithiol, 4-methyl-1,2-benzenedithiol, 4-butyl-1,2-benzenedithiol and 4-chloro-1,2-benzenedithiol; and (vii) high-molecular-weight compounds containing mercapto group, e.g., modified polyvinyl alcohol containing a mercapto group (these compounds may be used either individually or in combination);

(c) compounds containing an amino group: (i) aliphatic or aromatic amine-containing compounds, e.g., ammonia, methylamine, ethylamine, n-propylamine, isopropylamine, monoethanolamine, n-propanolamine, isopropanolamine, aniline, cyclohexylamine, n-butylamine, n-pentylamine, n-hexylamine, n-heptylamine, n-octylamine, n-nonylamine, n-decylamine, n-undecylamine, n-dodecylamine, n-tridecylamine, n-tetradecylamine, n-pentadecylamine, n-hexadecylamine, n-heptadecylamine, n-octadecylamine, n-eicosylamine, aminomethyltrimethylsilane, aminomethyltriethylsilane, aminomethyltripropylsilane, aminoethyltrimethylsilane, aminoethyltriethylsilane, aminoethyltripropylsilane, aminopropyltrimethylsilane, aminopropyltriethylsilane, aminopropyltripropylsilane, aminomethyltrimethoxysilane, aminomethyltriethoxysilane, aminomethyltripropoxysilane, aminomethyldimethoxymethylsilane, aminomethylmethoxydimethylsilane, aminomethyldiethoxymethylsilane, aminomethylethoxydimethylsilane, aminomethyldimethoxyethylsilane, aminomethylmethoxydiethylsilane, aminomethyldiethoxyethylsilane, aminomethylethoxydiethylsilane, aminoethyldimethoxymethylsilane, aminoethylmethoxydimethylsilane, aminoethyldiethoxymethylsilane, aminoethylethoxydimethylsilane, aminoethyldimethoxyethylsilane, aminoethylmethoxydiethylsilane, aminoethyldiethoxyethylsilane, aminoethylethoxydiethylsilane, aminopropyldimethoxymethylsilane, aminopropylmethoxydimethylsilane, aminopropyldiethoxymethylsilane, aminopropylethoxydimethylsilane, aminopropyldimethoxyethylsilane, aminopropylmethoxydiethylsilane, aminopropyldiethoxyethylsilane, aminopropylethoxydiethylsilane, aminomethylphenyldimethylsilane, diethylamine, diethanolamine, di-n-propanolamine, di-isopropanolamine, N-methylethanolamine and N-ethylethanolamine; (ii) alkylamino acrylates, e.g., dimethylaminoethyl acrylate, diethylaminoethyl acrylate, dimethylaminomethyl acrylate, diethylaminomethyl acrylate, adduct of diacrylate and diethylamine, and adduct of trimethylolpropane triacrylate and diethylamine; (iii) alkylaminoalkyl vinyl ethers, e.g., (meth)acrylamide, □-ethyl (meth)acrylamide, N-methyl (meth)acrylamide, N-butoxymethyl (meth)acrylamide, diacetone (meth)acrylamide, N,N-dimethyl (meth)acrylamide, N,N-diethyl (meth)acrylamide, N,N-dimethyl-p-styrenesulfoamide, N,N-dimethylaminoethyl (meth)acrylate, N,N-diethylaminoethyl (meth)acrylate, N,N-dimethylaminopropyl (meth)acrylate, N,N-diethylaminopropyl (meth)acrylate, N-[2-(meth)acryloyloxyethyl]piperidine, N-[2-(meth)acryloyloxyethyl]pyrrolidine, N-[2-(meth)acryloyloxyethyl]morpholine, 4-(N,N-dimethylamino) styrene, 4-(N,N-diethylamino)styrene, 4-vinyl pyridine, 2-dimethylaminoethylvinyl ether, 2-diethylaminoethyl vinyl ether, 4-dimethylaminobutyl vinyl ether, 4-diethylaminobutyl vinyl ether and 6-dimethylaminohexyl vinyl ether; and (iv) high-molecular-weight compounds containing amino group (these compounds may be used either individually or in combination);

(d) compounds containing a carboxyl group: (i) saturated aliphatic monocarboxylates, e.g., formic, acetic, propionic, isovaleric and hexanoic acid; (ii) saturated aliphatic dicarboxylates, e.g., oxalic, malonic and succinic acid; (iii) organic carboxylic acids having a ester group, e.g., 2-acryloyloxyethylsuccinic and 3-acryloyloxypropylphthalic acid; (iv) carbocyclic carboxylic acids, e.g., benzoic, toluyl and salicylic acid; (v) heterocyclic carboxylic acids, e.g., furancarboxylic, thiophenecarboxylic and pyridinecarboxylic acid; (vi) various unsaturated mono- or di-carboxylic or unsaturated dibasic acids, e.g., acrylic, methacrylic, crotonic, itaconic, maleic and fumaric acid, and monobutyl itaconate and monobutyl maleate; (vii) acid anhydrates derived from carboxylic acid, e.g., acetic, succinic and phthalic anhydrides; and (viii) high-molecular-weight carboxylic acids, e.g., polyacrylic and polymethacrylic acids (these compounds may be used either individually or in combination);

(e) compounds containing an isocyanate group: (i) cyclohexyl isocyanate, n-decyl isocyanate, n-undecyl isocyanate, n-dodecyl isocyanate, n-tridecyl isocyanate, n-tetradecyl isocyanate, n-pentadecyl isocyanate, n-hexadecyl isocyanate, n-heptadecyl isocyanate, n-octadecyl isocyanate, n-eicosyl isocyanate, phenyl isocyanate and naphthyl isocyanate; and (ii) isocyanate compounds having 2 or more isocyanate groups, e.g., those used for carbodiimidated resins (these compounds may be used either individually or in combination); and (f) to (j): compounds having a representative bonding group reactive with an isocyanate group, which can be produced by polymerization of the compound of (a) to (e), respectively, with a varying isocyanate compound under heating in the presence or absence of a catalyst.

The representative compounds reactive with an isocyanate group are not limited to those compounds (a) to (j). Any compound may be used, so long as it has a functional group or bond reactive with an isocyanate group (e.g., acid anhydrides and a compound having an unsaturated double bond). They may be used either individually or in combination.

When $R^1$ or $R^3$ in the chemical formula (1) is a residue represented by the compound of one of (a) to (j) having the functional group or bond, the bond Y is represented by:

(a') urethane bond —NHCOO—
(b') thiourethane bond —NHCSO—
(c') urea bond —NHCONH—
(d') amide bond —NHCO—
(e') carbodiimide bond —NCN—(in the presence of a catalyst) or dimerized isocyanate bond

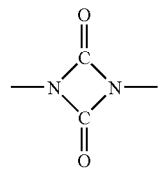

(f') allophanate

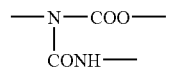

(g') biuret bond

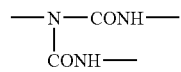

(h') acylurea bond

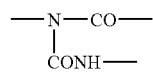

(i') uretonimine bond

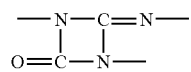

(j') trimerized isocyanate bond

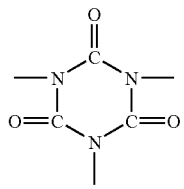

The carbodiimide resin represented by the chemical formula (1) has average molecular weight of 200 to 100,000, preferably 500 to 50,000, further preferably 600 to 10,000 and most preferably 1000 to 5,000.

Number of carbodiimide groups in one carbodiimide resin molecule is 1 to 100, preferably 2 to 80, further preferably 3 to 50 and most preferably 4 to 30.

The isocyanates as the starting compounds for producing the carbodiimide compound (carbodiimide resin) for the present invention include those having per molecule at least 2 isocyanate groups, preferably one or more isocyanates selected from bifunctional isocyanate, hexamethylene diisocyanate (hereinafter sometimes referred to as HDI), hydrogenated xylylene diisocyanate ($H_6$XDI), xylylene diisocyanate (XDI), 2,2,4-trimethylhexamethylene diisocyanate (TMHDI), 1,12-diisocyanatedodecane (DDI), norbornane diisocyanate (NBDI), 4,4'-dicyclohexylmethane diisocyanate (HMDI) and tetramethylxylylene diisocyanate (TMXDI), isophorone diisocyanate (IPDI), 2,4,6-triisopropylphenyl diisocyanate (TIDI), 4,4'-diphenylmethane diisocyanate (MDI), tolylene diisocyanate (TDI) and hydrogenated tolylene diisocyanate (HTDI), among others.

The first step for producing the carbodiimide compound (carbodiimide resin) for the present invention is heating the above-described isocyanate in the presence of a carbodiimidation catalyst.

The catalyst useful for the present invention is not limited, so long as it can accelerate the carbodiimidation reaction, but organophosphorus-based compounds are suitable, in particular phospholene oxides for their activity.

More specifically, these phospholene oxides include 3-methyl-1-phenyl-2-phospholene-1-oxide, 3-methyl-1-ethyl-2-phospholene-1-oxide, 1,3-dimethyl-2-phospholene-1-oxide, 1-phenyl-2-phospholene-1-oxide, 1-ethyl-2-phospholene-1-oxide, 1-methyl-2-phospholene-1-oxide and double-bond isomers thereof, of which 3-methyl-1-phenyl-2-phospholene-1-oxide is more suitable for its industrial availability. Timing of incorporation of the carbodiimidation catalyst is not limited, i.e., it may be incorporated before, during or after the isocyanate is heated. It is however preferable to incorporate the catalyst while the reaction system is at relatively low temperature for safety considerations.

The first step for producing the carbodiimide compound for the present invention is heating the above-described isocyanate in the presence of a carbodiimidation catalyst, as described above. The synthesis process may be effected in the presence or absence of a solvent, or a solvent may be added while the reaction process is proceeding. Whether a solvent is used or not, or its addition timing, when used, can be selected depending on specific purposes or objects of the carbodiimide compound.

The specific examples of the solvents useful for the present invention include ketones, e.g., acetone, methylethylketone, methylisobutylketone and cyclohexanone; esters, e.g., ethyl acetate, butyl acetate, ethyl propionate and cellosolve acetate; aliphatic or aromatic hydrocarbons, e.g., pentane, 2-methylbutane, n-hexane, cyclohexane, 2-methylpentane, 2,2-dimethylbutane, 2,3-dimethylbutane, heptane, n-octane, isooctane, 2,2,3-trimethylpentane, decane, nonane, cyclopentane, methylcyclopentane, methylcyclohexane, ethylcyclohexane, p-menthane, benzene, toluene, xylene and ethylbenzene; halogenated hydrocarbons, e.g., carbon tetrachloride, trichloroethylene, chlorobenzene and tetrabromoethane; ethers, e.g., ethyl ether, dimethyl ether, trioxane and tetrahydrofuran; acetals, e.g., methylal and diethyl acetal; and sulfur- or nitrogen containing organic compounds, e.g., nitropropene, nitrobenzene, pyridine, dimethylformamide, dimethylsulfoxide and acetonitrile. The solvent is not limited, so long as it is not harmful to the isocyanate or carbodiimide group during the synthesis process, and can be selected, as required, for a specific purpose of the polymerization process. These solvents may be used either individually or in combination.

The following compounds may be used as diluents, in addition to the above solvents, provided that the carbodiimide resin terminal is sealed with the hydrophilic segment, described later, after completion of the synthesis process: water; alcohols, e.g., methanol, ethanol, 1-propanol, 2-propanol, 1-butanol, 2-butanol, isobutyl alcohol, tert-butyl alcohol, 1-pentanol, 2-pentanol, 3-pentanol, 2-methyl-1-butanol, isopentyl alcohol, tert-pentyl alcohol, 1-hexanol, 2-methyl-1-pentanol, 4-methyl-2-pentanol, 2-ethyl butanol, 1-heptanol, 2-heptanol, 3-heptanol, 2-octanol, 2-ethyl-1-hexanol, benzyl alcohol and cyclohexanol; and ether alcohols, e.g., methyl cellosolve, ethyl cellosolve, isopropyl cellosolve, butyl cellosolve and diethylene glycol monobutyl ether. These may be used either individually or in combination. When used as a diluent, the above compound is preferably used at relatively low temperature, because of high reactivity of the carbodiimide group.

A water-soluble polycarbodiimide is preferably used as the carbodiimide compound (carbodiimide resin) for the present invention, on account of recent environmental considerations.

Such a polycarbodiimide has a hydrophilic segment which is represented by, e.g., the chemical formula (1) with $R^1$ or $R^3$ being at least one type of residue represented by one of the chemical formulae (2) to (5).

(i) A residue of alkylsulfonate having at least one reactive hydroxyl group, represented by:

$$R^5{-}SO_3{-}R^4{-}OH \quad (2)$$

(wherein, $R^4$ is an alkylene group of 1 to 10 carbon atoms; and $R^5$ is an alkali metal).

The alkali metal alkylsulfonates include sodium hydroxyethanesulfonate and sodium hydroxypropanesulfonate, of which the latter is more preferable.

(ii) A quaternary salt of a dialkylaminoalcohol residue represented by:

$$(R^6)_2{-}NR'{-}R^7{-}OH \quad (3)$$

(wherein, $R^6$ is a lower alkyl group of 1 to 4 carbon atoms; $R^7$ is an alkylene or oxyalkylene group of 1 to 10 carbon atoms; and R' is a group derived from an agent for producing a quaternary salt).

The dialkylaminoalcohols include 2-dimethylaminoethanol, 2-diethylaminoethanol, 3-dimethylamino-1-propanol, 3-diethylamino-1-propanol, 3-diethylamino-2-propanol, 5-diethylamino-2-propanol and 2-(di-n-butylamino)ethanol, of which 2-dimethylaminoethanol is more preferable.

The agents for producing a quaternary salt include dimethylsulfuric acid and methyl p-toluenesulfonate.

(iii) A quaternary salt of a dialkylaminoalkylamine residue represented by:

$$(R^6)_2—NR'—R^7—NH_2 \quad (4)$$

(wherein, $R^6$, $R^7$ and $R'$ are each the same as the corresponding one in the formula (3)).

The dialkylaminoalkylamines include 3-dimethylamino-n-propylamine, 3-diethylamino-n-propylamine and 2-(diethylamino)ethylamine, of which 3-dimethylamino-n-propylamine is more preferable.

The agents for producing a quaternary salt include dimethylsulfuric acid and methyl p-toluenesulfonate.

(iv) A poly(alkylene oxide) residue sealed with an alkoxy group at the terminal, having at least one reactive hydroxyl group, represented by:

$$R^8—(O—CHR^9—CH)_n—OH \quad (5)$$

(wherein, $R^8$ is a lower alkyl group of 1 to 4 carbon atoms; $R^9$ is hydrogen atom or methyl group; and "m" is an integer of 2 to 30).

The poly(alkylene oxides) include poly(ethylene oxide) monomethyl ether, poly(ethylene oxide)monoethyl ether, poly(ethylene oxide/propylene oxide)monomethyl ether and poly(ethylene oxide/propylene oxide)monoethyl ether, of which poly(ethylene oxide)monomethyl ether is more preferable.

3. A Base Particle (A) with a Functional Group and a Process for Producing the Same The process for producing a base particle (A) of a thermoplastic resin having a functional group for the present invention includes one for producing a thermoplastic resin having a functional group reactive with carbodiimide group (specifically, active hydrogen group, e.g., hydroxyl, carboxyl, amino or thiol group) and particles thereof. More specifically, it includes:

(1) A process for producing a thermoplastic resin solution by common mass or solution polymerization, and a particle thereof by crushing and classifying the resin.

(2) A process for producing a thermoplastic resin by the above polymerization process, and a particle (including spherical particle) thereof by dropping the polymer.

(3) A process for producing a thermoplastic resin and a particle (including spherical particle) thereof by emulsion or suspension polymerization effected in an aqueous solution.

(4) A process for producing a thermoplastic resin and a particle thereof by the above process (3) combined with a seed process or the like.

(5) A process for producing a thermoplastic resin and a particle (mainly spherical particle) thereof by dispersion polymerization in a non-aqueous solvent or water-mixed solvent.

(6) A process for producing a thermoplastic resin and a particle thereof by the above process (5) combined with a seed process or the like.

(7) Extrusion or the like to produce pellets, particles or film-shaped articles of a thermoplastic resin.

(8) Injection molding or the like to produce formed articles of a thermoplastic resin.

The process for the present invention is not limited to the above, and any process may be used so long as it produces a composition and a particle thereof which satisfies the necessary conditions, e.g., quantity of the functional group in a base particle (A) and resin, particle size, and thickness of the formed article.

In the process for producing the base particle (A) with a functional group, the particle produced by one of the above polymerization processes may have crosslinked structure beforehand, and a metal or inorganic particle can also be used for producing a composite particle of the present invention, as long as it has, at the surface or inside thereof, a functional group reactable with a carbodiimide group.

The base particle (A) for the present invention is the one having a functional group reactive with carbodiimide group. More specifically, it has an active hydrogen group, e.g., hydroxyl (—OH), carboxyl (—COOH), amino (—NH$_2$) or thiol (—SH) group.

The base particle of thermoplastic resin has weight-average molecular weight of around 1,000 to 3,000,000, or 3,000 to 500,000 when it is spherical. However, said weight-average molecular weight is not applied to a thermosetting resin.

The thermoplastic resin is one of styrene-based polymer, (meth)acryl-based polymer, a copolymer produced by addition polymerization with another vinyl-based polymer, polymer produced by hydrogen transfer polymerization, polymer produced by polycondensation and polymer produced by addition condensation.

The specific examples of the representative starting copolymerizable monomers as a main component for the above polymer include (i) styrenes, e.g., styrene, o-methyl styrene, m-methyl styrene, p-methyl styrene, □-methyl styrene, p-ethyl styrene, 2,4-dimethyl styrene, p-n-butyl styrene, p-tert-butyl styrene, p-n-hexyl styrene, p-n-octyl styrene, p-n-nonyl styrene, p-n-decyl styrene, p-n-dodecyl styrene, p-methoxystyrene, p-phenyl styrene, p-chlorostyrene and 3,4-dichlorostyrene; (ii) (meth)acrylate esters, e.g., methyl acrylate, ethyl acrylate, n-butyl acrylate, isobutyl acrylate, propyl acrylate, hexyl acrylate, 2-ethylhexyl acrylate, n-octyl acrylate, dodecyl acrylate, lauryl acrylate, stearyl acrylate, 2-chloroethyl acrylate phenyl, methyl □-chloroacrylate, methyl methacrylate, ethyl methacrylate, n-butyl methacrylate, isobutyl methacrylate, propyl methacrylate, hexyl methacrylate, 2-ethylhexyl methacrylate, n-octyl methacrylate, dodecyl methacrylate, lauryl methacrylate and stearyl methacrylate; (iii) vinyl esters, e.g., vinyl acetate, vinyl propionate, vinyl benzoate and vinyl butyrate; (iv) (meth)acrylic acid derivatives, e.g., acrylonitrile and methacrylonitrile; (v) vinyl ethers, e.g., vinyl methyl ether, vinyl ethyl ether and vinyl isobutyl ether; (vi) vinyl ketones, e.g., vinyl methyl ketone, vinyl hexyl ketone and methyl isopropenyl ketone; (vii) N-vinyl compounds, e.g., N-vinyl pyrrole, N-vinyl carbazole, N-vinyl indole and N-vinyl pyrrolidone; and (viii) (meth)acrylate esters having a fluoroalkyl group, e.g., vinyl fluoride, vinylidene fluoride, tetrafluoroethylene, hexafluoropropylene, trifluoroethyl acrylate and tetrafluoropropyl acrylate. These compounds may be used either individually or in combination.

The specific examples of the representative radical-polymerizable monomers or compounds having a carboxyl group as the functional group reactive with a carbodiimide group include various unsaturated mono- and di-carboxylic acids and unsaturated dibasic acids, e.g., acrylic, methacrylic, crotonic, itaconic, maleic and fumaric acid, and monobutyl itaconate and monobutyl maleate. These compounds may be used either individually or in combination.

The specific examples of the representative radical-polymerizable monomers having a hydroxyl group as the functional group reactive with a carbodiimide group include (meth)acrylate-based monomers, e.g., 2-hydroxyethyl (meth)acrylate, 2-hydroxypropyl (meth)acrylate, 3-hydroxypropyl (meth)acrylate and 4-hydroxybutyl (meth)acrylate; polyalkylene glycol (meth)acrylate-based compounds, e.g., polyethylene glycol mono(meth)acrylate and polypropylene glycol mono(meth)acrylate; various types of hydroxyalkyl vinyl ethers, e.g., hydroxyethyl vinyl ether and hydroxybutyl vinyl ether; and various allyl compounds, e.g., allyl alcohol and 2-hydroxyethyl allyl ether. These compounds may be used either individually or in combination.

The specific examples of the representative polymers having a hydroxyl group include thermoplastic resins having a hydroxyl group, e.g., totally or partially saponified resins (e.g., polyvinyl alcohol (PVA)), and saponified resins (e.g., polymer having acetate esters composed of a copolymer of vinyl acetate and another vinyl monomer). These polymers are also useful for the present invention.

The specific examples of the representative radical-polymerizable monomers or compounds having an amino group as the functional group reactive with a carbodiimide group include (meth)acrylamide, □-ethyl (meth)acrylamide, N-methyl (meth)acrylamide, N-butoxymethyl (meth)acrylamide, diacetone (meth)acrylamide, N,N-dimethyl (meth)acrylamide, N,N-diethyl (meth)acrylamide, N,N-dimethyl-p-styrenesulfoamide, N,N-dimethylaminoethyl (meth)acrylate, N,N-diethylaminoethyl (meth)acrylate, N,N-dimethylaminopropyl (meth)acrylate, N,N-diethylaminopropyl (meth)acrylate, N-[2-(meth)acryloyloxyethyl]piperidine, N-[2-(meth)acryloyloxyethylene]pyrrolidine, N-[2-(meth)acryloyloxyethyl]morpholine, 4-(N,N-dimethylamino)styrene, 4-(N,N-diethylamino)styrene, 4-vinyl pyridine, 2-dimethylaminoethyl vinyl ether, 2-diethylaminoethyl vinyl ether, 4-dimethylaminobutyl vinyl ether, 4-diethylaminobutyl vinyl ether and 6-dimethylaminohexyl vinyl ether. These compounds may be used either individually or in combination.

The specific examples of the representative radical-polymerizable monomers or compounds having a thiol (mercapto) group as the functional group reactive with a carbodiimide group include those having an unsaturated double bond, e.g., 2-propene-1-thiol, 3-butene-1-thiol, 4-pentene-1-thiol, 2-mercaptoethyl (meth)acrylate, 2-mercapto-1-carboxyethyl (meth)acrylate, N-(2-mercaptoethyl)acrylamide, N-(2-mercapto-1-carboxyethyl)acrylamide, N-(2-mercaptoethyl)methacrylamide, N-(4-mercaptophenyl)acrylamide, N-(7-mercaptonaphthyl)acrylamide and mono-2-mercaptoethylamide maleate; and compounds having crosslinked structure between a compound having at least 2 functional groups and a monomer having a group reactive with a thiol (mercapto) group and a —C═C— double bond (e.g., tetramethylenedithiol, hexamethylenedithiol, octamethylenedithiol or decamethylenedithiol). These compounds may be used either individually or in combination. Thermoplastic resins having a thiol (mercapto) group, e.g., modified polyvinyl alcohol having a thiol (mercapto) group, are also useful for the present invention.

When 2 or more functional groups, e.g., carboxyl, hydroxyl, amino and thiol (mercapto) group, are to be incorporated to a copolymer, the above-described monomers having a varying reactive group may be combined with each other to produce a multi-functional copolymer. Moreover, multi-functional polymer particles containing a carbodiimide group can be produced by adjusting carbodiimide resin content, reaction temperature or other condition.

When the crosslinkable (hardened type) resins or its particles are to be produced, a monomer with a multi-functional unsaturated double bond as a crosslinking agent may be incorporated, depending on their purposes.

The specific examples of the representative crosslinking agents include aromatic divinyl compounds, e.g., divinyl benzene and divinyl naphthalene, ethylene glycol diacrylate, ethylene glycol dimethacrylate, triethylene glycol dimethacrylate, tetraethylene glycol dimethacrylate, 1,3-butylene glycol dimethacrylate, trimethylolpropane triacrylate, trimethylolpropane trimethacrylate, 1,4-butanediol diacrylate, neopentyl glycol diacrylate, 1,6-hexanediol diacrylate, pentaerythritol triacrylate, pentaerythritol tetraacrylate, pentaerythritol dimethacrylate, pentaerythritol tetramethacrylate, glycerol acryloyloxydimethacrylate, N,N-divinyl aniline, divinyl ether, divinyl sulfide and divinyl sulfone. These may be used either individually or in combination.

For radical polymerization to produce a thermoplastic resin and a particle for the present invention, a known radical polymerization initiator may be used.

The specific examples of the representative radical polymerization initiators include peroxides, e.g., benzoyl peroxide, cumene hydroperoxide, t-butyl hydroperoxide; persulfates, e.g., sodium persulfate, potassium persulfate and ammonium persulfate; and azo-based compounds, e.g., azobisisobutylonitrile, azobismethylbutylonitrile and azobisisovaleronitrile. These compounds may be used either individually or in combination.

For production of the thermoplastic resin particle reactive with a carbodiimide group, various synthesis/polymerization processes described above may be employed; they may be synthesized in the absence of solvent, e.g., mass polymerization, or in the presence of solvent, e.g., solution polymerization.

The specific examples of the representative polymerization solvents include water; alcohols, e.g., methanol, ethanol, 1-propanol, 2-propanol, 1-butanol, 2-butanol, isobutyl alcohol, tert-butyl alcohol, 1-pentanol, 2-pentanol, 3-pentanol, 2-methyl-1-butanol, isopentyl alcohol, tert-pentyl alcohol, 1-hexanol, 2-methyl-1-pentanol, 4-methyl-2-pentanol, 2-ethyl butanol, 1-heptanol, 2-heptanol, 3-heptanol, 2-octanol, 2-ethyl-1-hexanol, benzyl alcohol and cyclohexanol; ether alcohols, e.g., methyl cellosolve, ethyl cellosolve, isopropyl cellosolve, butyl cellosolve, and diethylene glycol monobutyl ether; ketones, e.g., acetone, methyl ethyl ketone, methyl isobutyl ketone and cyclohexanone; esters, e.g., ethyl acetate, butyl acetate, ethyl propionate and cellosolve acetate; aliphatic or aromatic hydrocarbons, e.g., pentane, 2-methylbutane, n-hexane, cyclohexane, 2-methylpentane, 2,2-dimethylbutane, 2,3-dimethylbutane, heptane, n-octane, isooctane, 2,2,3-trimethylpentane, decane, nonane, cyclopentane, methylcyclopentane, methylcyclohexane, ethylcyclohexane, p-menthane, dicyclohexane, benzene, toluene, xylene and ethylbenzene; halogenated hydrocarbons, e.g., carbon tetrachloride, trichloroethylene, chlorobenzene and tetrabromoethane; ethers, e.g., ethyl ether, dimethyl ether, trioxane and tetrahydrofuran; acetals, e.g., methylal and diethyl acetal; fatty acids, e.g., formic acid, acetic acid and propionic acid; and sulfur- or nitrogen containing organic compounds, e.g., nitropropene, nitrobenzene, dimethyl amine, monoethanolamine, pyridine, dimethylformamide, dimethylsulfoxide and acetonitrile. The solvent is not limited, and can be selected, as required, for a specific purpose of the polymerization process. These solvents may be used either individually or in combination.

A specific polymerization may incorporate, as required, one or more additives, e.g., polymer-dispersants; stabilizers, emulsifiers and surfactants, for production of the particles.

The specific examples of the representative additives are cited. The dispersants and stabilizers include various hydrophilic and hydrophobic ones, such as polystyrene derivatives, e.g., polyhydroxystyrene, polystyrenesulfonic acid, vinyl phenol/(meth)acrylate ester copolymer, styrene/(meth)acrylate ester copolymer and styrene/vinyl phenol/(meth)acrylate ester copolymer; poly(meth)acrylic acid and derivatives thereof, e.g., poly(meth)acrylic acid, poly(meth)acrylamide, polyacrylonitrile, polyethyl (meth)acrylate and polybutyl (meth)acrylate; polyvinyl alkyl ether derivatives, e.g., polymethyl vinyl ether, polyethyl vinyl ether, polybutyl vinyl ether and polyisobutyl vinyl ether; cellulose and derivatives thereof, e.g., cellulose, methyl cellulose, cellulose acetate, cellulose nitrate, hydroxymethyl cellulose, hydroxyethyl cellulose, hydroxypropyl cellulose and carboxymethyl cellulose; polyvinyl acetate and derivatives thereof e.g., polyvinyl alcohol, polyvinyl butyral, polyvinyl formal, and polyvinyl acetate; nitrogen-containing polymer derivatives, e.g., polyvinyl pyridine, polyvinyl pyrrolidone, polyethyleneimine and poly-2-methyl-2-oxazoline; halogenated polyvinyl derivatives, e.g., polyvinyl chloride and polyvinylidene chloride; and polysiloxane derivatives, e.g., polydimethyl siloxane. These may be used either individually or in combination.

The emulsifiers (surfactants) useful for the present invention include anionic emulsifiers, including alkyl sulfate ester salts, e.g., sodium lauryl sulfate, alkyl benzenesulfonates, e.g., sodium dodecylbenzenesulfonate, alkylnaphthalenesulfonates, fatty acid salts, alkyl phosphates, and alkyl sulfosuccinates; cationic emulsifiers, including alkylamine salts, quarternary ammonium salts, alkyl betaine, and amine oxide; nonionic emulsifiers, including polyoxyethylene alkyl ether, polyoxyethylene alkyl allyl ether, polyoxyethylene alkyl phenyl ether, sorbitan fatty acid ester, glycerin fatty acid ester and polyoxyethylene fatty acid ester. These may be used either individually or in combination.

4. Process for Producing a Composite Particle

A composite particle of the present invention is produced first by producing a thermoplastic resin having a functional group reactive with a carbodiimide group or a particle thereof, and reacting the resin or particle with a carbodiimide resin under heating in the presence of a solvent which dissolves the carbodiimide resin but not the thermoplastic resin or particle, to obtain a composite particle with a shell layer comprised of a carbodiimide resin bonded to a base particle without deforming shape of the particle. More specifically, the process comprises two steps: the first step in which the base particle (A) having a functional group is mixed with the carbodiimide compound (B) in the presence of at least one type of water or organic solvent which dissolves (B) but not (A), to have the latter impregnated only in the surface layer section or both surface layer section and inside of the former; and the subsequent second step in which a shell layer comprised of the carbodiimide resin (B) is formed at the surface of the base particle (A) so that the a shell layer covers the base particle (A) by the subsequent reaction between reaction groups of the former the base particle (A) and a carbodiimide groups of the carbodiimide resin (B). Thus composite particle with a shell layer comprised of a carbodiimide resin bonded to functional groups of the base particle (A) can be obtained.

The first step may incorporate, as required, adequate additives, e.g., dispersants, antioxidants, stabilizers or emulsifiers in addition to the base particle (A) and the carbodiimide resin (B).

The specific examples of the representative additives are described. The dispersants, stabilizers and emulsifiers useful for the process are similar to those described earlier. On the other hand, the antioxidants useful for the process include those based on phenol, sulfur, phosphorus, amine, hydroquinone and hydroxylamine. These may be used either individually or in combination.

Content of a carbodiimide group of the carbodiimide resin (B) necessary to form a shell layer comprised of a carbodiimide resin at the surface of the base particle (A) is from 50 to 1000 carbodiimide equivalents, preferably from 80 to 800, further preferably from 100 to 500 and most preferably from 200 to 400.

The base particle (A) with a functional group reactable with a carbodiimide group necessary to form a shell layer at the surface of the base particle (A) by bonding therewith is one satisfying from 30 to 2000 equivalents functional groups, preferably from 50 to 1000 equivalents, further preferably from 50 to 900 equivalents and most preferably from 100 to 500 equivalents. Equivalent content over 2000 reduces bond amount with a carbodiimide group, resulting in insufficient formation of a shell layer and reduction of function as a composite particle.

As a particle with a functional group, there is no specific limitation as long as it contains a functional group reactable with a carbodiimide group such as a hydroxy group, a carboxy group, an amino group, a thiol group, an epoxy group, an isocyanate group, a carbodiimide group, and the like, and among others a particle with an active hydrogen group such as a carboxyl group, a hydroxyl group, an amino group and a thiol group, are preferable due to providing a strong bonding group by easy reaction with a carbodiimide group. Typical examples of a bonding group have a bond including:

1) an isourea bond for a carbodiimide group and a hydroxyl group

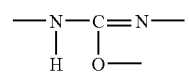

2) a guanidine bond for a carbodiimide group and an amino group

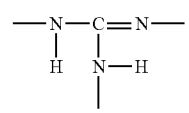

3) a carbamoylamide bond for a carbodiimide group and a carboxyl group and

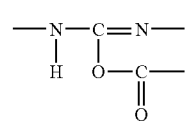

4) a thiourea bond for a carbodiimide group and a thiol group.

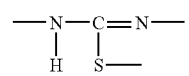

It is also possible to convert such a bond to a further strengthened bond group (such as an amide group, an acylurea group, and the like) by a transformation reaction by changing types of a bond group, catalyst or increasing temperature or pressure conditions, and the like.

The base particle (A) in accordance with the present invention includes such one as a metal particle or inorganic particle without a reaction group reactable with a carbodiimide group, by surface treatment to furnish a reaction group reactable with a carbodiimide group, because requirement as the base particle (A) is to have a reaction group reactable with a carbodiimide group at the particle surface.

Shape of a particle with a functional group is preferably true sphere or near sphere, however, a particle with different shape (non-sphere) may be used.

The base particle (A) preferably has particle diameter of from 0.01 to 10,000 μm, preferably from 0.01 to 1,000 μm, further preferably from 0.1 to 500 μm and most preferably from 0.5 to 300 μm.

Even when a resin with a reactive group is a film-like composition, it can be cured and form a shell layer comprised of a carbodiimide resin bonded to the composition, as long as film-like thickness is within the above-described particle diameter range.

The addition amount of a carbodiimide resin depends on cure level, thickness of a shell layer formable and residue of a carbodiimide group necessary, however, is about from 0.1 to 20 equivalents, preferably from 0.3 to 8 equivalents and further preferably from 0.5 to 5 equivalents per 1 functional group equivalent of the base particle.

In a reaction between a reaction group of the base particle (A) and a carbodiimide group of the carbodiimide resin (B), it is preferable to control reaction temperature. Any reaction temperature is applicable as long as it is not lower than the lowest temperature enough to make a chemical reaction possible between a functional group of the base particle and a carbodiimide group. It depends on types of a functional group of the base particle, types of a carbodiimide resin, types of a solvent, and the like, however, a range from 10 to 200° C. is appropriate, preferably a range from 15 to 150° C., further preferably a range from 20 to 130° C. and most preferably a range from 30 to 110° C.

Reaction time required to bond a reaction group in the base particle (A) with a carbodiimide group is not limited as long as required to nearly complete objective curing reaction and depends on a carbodiimide resin used and the addition amount thereof, type of a functional group in a resin (particle), viscosity of a solvent, concentration, and the like, however, is, for example, from 1 to 24 hours at 40° C. and preferably from about 6 to 24 hours.

The solvent which dissolves a carbodiimide resin but not a thermoplastic resin or a particle thereof is at least one type of solvent selected from the group consisting of water and organic solvents. It may be adequately selected in consideration of type and content of the carbodiimide resin used, type of the thermoplastic resin (or particle) and type of the functional group it contains, purpose of applications, and so on.

The specific examples of the representative solvents include water; alcohols, e.g., methanol, ethanol, 1-propanol, 2-propanol, 1-butanol, 2-butanol, isobutyl alcohol, tert-butyl alcohol, 1-pentanol, 2-pentanol, 3-pentanol, 2-methyl-1-butanol, isopentyl alcohol, tert-pentyl alcohol, 1-hexanol, 2-methyl-1-pentanol, 4-methyl-2-pentanol, 2-ethyl butanol, 1-heptanol, 2-heptanol, 3-heptanol, 2-octanol, 2-ethyl-1-hexanol, benzyl alcohol and cyclohexanol; and ether alcohols, e.g., methyl cellosolve, ethyl cellosolve, isopropyl cellosolve, butyl cellosolve, and diethylene glycol monobutyl ether; ketones, e.g., acetone, methylethylketone, methylisobutylketone and cyclohexanone; esters, e.g., ethyl acetate, butyl acetate, ethyl propionate and cellosolve acetate; aliphatic or aromatic hydrocarbons, e.g., pentane, 2-methylbutane, n-hexane, cyclohexane, 2-methylpentane, 2,2-dimethylbutane, 2,3-dimethylbutane, heptane, n-octane, isooctane, 2,2,3-trimethylpentane, decane, nonane, cyclopentane, methylcyclopentane, methylcyclohexane, ethylcyclohexane, p-menthane, dicyclohexane, benzene, toluene, xylene and ethylbenzene; halogenated hydrocarbons, e.g., carbon tetrachloride, trichloroethylene, chlorobenzene and tetrabromoethane; ethers, e.g., ethyl ether, dimethyl ether, trioxane and tetrahydrofuran; acetals, e.g., methylal and diethyl acetal; fatty acids, e.g., formic, acetic and propionic acid; and sulfur- or nitrogen containing organic compounds, e.g., nitropropene, nitrobenzene, dimethyl amine, monoethanolamine, pyridine, dimethylformamide and dimethylsulfoxide. The more preferable solvents are water, lower alcohols (e.g., methanol and ethanol), a mixture of water and lower alcohol, toluene, dimethylformamide (DMF), tetrahydrofuran (THF), methylethylketone (MEK), methylisobutylketone (MIBK), acetone, N-methyl-2-pyrrolidone (NMP), dichloromethane and tetrachloroethylene. The still more preferable ones are water, lower alcohols (e.g., methanol and ethanol), a mixture of water and lower alcohol (e.g., methanol and ethanol), a mixture of water and a hydrophilic solvent such as dimethylformamide (DMF), tetrahydrofuran (THF), acetone and N-methyl-2-pyrrolidone (NMP) and toluene. The solvent is not limited, and can be selected, as required, for a specific purpose of the polymerization process. These solvents may be used either individually or in combination.

Solution concentration in a curing reaction to form a shell layer of a carbodiimide resin is expressed by the following equation and is from 1 to 60% by weight, preferably from 3 to 50% by weight, further preferably from 5 to 40% by weight and most preferably from 6 to 30% by weight.

Solution concentration (% by weight)=100×(total solution−solvent)/total solution Thickness of a shell layer in a composite particle covered by a shell layer of the present invention depends on types of a carbodiimide resin (raw material isocyanate, molecular weight, terminal modification, and the like) and the addition amount thereof, types and the addition amount of a base particle, synthesis conditions, and the like, however, is suitably from 0.01 to 20 μm, preferably from 0.02 to 10 μm, further preferably from 0.05 to 8 μm and most preferably from 0.1 to 3 μm.

It is also possible to adjust curing performance, thickness of a shell layer, and the like, depending on applications, by types, molecular weight and the addition amount of a carbodiimide resin used, reaction temperature, a solvent used, type of a functional group contained in a base particle, and the like.

For example, in the case of using a carbodiimide resin obtained from aromatic isocyanate as a raw material, it is easy to obtain particles with high crosslinking density at relatively low temperature due to having high reactivity and thus can furnish high adhesion (reactivity) by a shell layer of a carbodiimide resin obtained at the particle surface.

Higher molecular weight of a carbodiimide resin used or higher content of a carbodiimide group per molecule can provide a thicker shell layer, which also improves glueability and tackiness of a particle obtained.

Further, as a carbodiimide resin in accordance with a composite particle of the present invention such as described above, a carbodiimide resin (or polycarbodiimide resin) represented by the following chemical formula (1) can be used:

$$R^1-Y-(R^2-N=C=N)_n-R^2-Y-R^3 \quad (1)$$

, and it is possible to change reactivity, crosslinking density, and the like by types of organic group residue represented by $R^2$ and molecular length between carbodiimide groups and thus a composite particle suitable to each application can be obtained by selecting them as appropriate.

Further, a carbodiimide resin used in response to applications may be a single resin, or a composite carbodiimide resin by combining two types or more isocyanate raw materials used, or a mixed carbodiimide resin by mixing two types or more of single carbodiimide resins or composite carbodiimide resins may be used to obtain a composite particle.

Particle diameter distribution of a composite particle covered by a shell layer of the present invention satisfies the following relations, when expressed by CV value (variation degree) defined by the following equation:

$$CV\ (\%) = (\text{standard deviation/average particle diameter}) \times 100$$

$0.5 \leq \text{"CCV"}/\text{"MCV"} \leq 1.4$, preferably $0.6 \leq \text{"CCV"}/\text{"MCV"} \leq 1.3$, further preferably $0.7 \leq \text{"CCV"}/\text{"MCV"} \leq 1.2$ and most preferably $0.8 \leq \text{"CCV"}/\text{"MCV"} \leq 1.1$, wherein "MCV" and "CCV" are, CV value of a base particle (A) and CV value of a composite particle covered by a shell layer of a carbodiimide resin, respectively. In other words, even when a shell layer is formed, the shape of a base particle can be maintained uniform without deformation if variation of particle diameter distribution is small and diameter of a base particle is uniform.

Further, when a base particle (A) is spherical, shape of a composite particle covered with a shell layer of the present invention satisfies;

$$1 \leq \text{the longest diameter/the shortest diameter} \leq 1.2$$

in two dimensional projection view of the spherical particle.

In the present description, a spherical particle is defined as one satisfying the above equation, when the longest diameter and the shortest diameter of a particle are measured by a photograph in magnification (from 50 to 10,000 times) sufficient to measure such diameters with scanning electron microscope (S-2150 model from Hitachi Co.; hereinafter named SEM) 15 times randomly per particle and repeated this on n=100 particles.

Average particle diameter was measured by a SEM photograph in magnification sufficient to measure the diameter, by randomly repeating for $n_1=500$ particles.

A composite particle covered with a shell layer is produced by mixing and reacting, under heating, a particle having a group reactive with a carbodiimide group (e.g., hydroxyl, amino, carboxyl or thiol group) with a carbodiimide resin in the presence of water or an organic solvent which dissolves the carbodiimide resin but not the particle. A composite particle shows performance effects of improved resistance to heat and solvents as hardened particle, and excellent glueability, tackiness and adhesion as the particle having carbodiimide.

Therefore, the thermoplastic resin can be hardened and furnished with carbodiimide groups inside and on the surface, and hence provides improved resistance to heat and chemicals, glueability, tackiness and adhesion to other substances. Moreover, use of water-soluble polycarbodiimide improves dispersibility of the particles, and allows a dye or pigment having a reactive group to react with the carbodiimide to produce fast color.

A composite particle, keeping the above performances and being a reactive crosslinked particle, can go into various areas, e.g., a crosslinking agent, a stabilizer for improving hydrolysis resistance, a hardening agent for thermoplastic resins, additive to elastomer, compatibilizers, adhesive agent, coating agent, paint, reinforcing material and aid for automobile and electric/electronic industries, and furniture and building materials. They are also applicable to spacers for liquid crystals, and the like.

In the process for producing a composite particle, the carbodiimide resin can be bonded directly and simply to a spherical particle synthesized by emulsion, suspension or dispersion polymerization, or the like. Therefore, the resultant particle can also be used as one with core/shell structure. Moreover, they can be hardened with a carbodiimide resin solution, allowing the unreacted, residual carbodiimide resin to be reused repeatedly. These features make the process more economically advantageous.

EXAMPLES

The present invention is described in more detail by EXAMPLES and COMPARATIVE EXAMPLES, which by no means limit the present invention, wherein "part(s)" and "water" mean part(s) by weight and distilled water, respectively, unless otherwise stated.

[Synthesis of Carbodiimide Resins]

Synthesis Example 1

In 1018 g of toluene were mixed 1,000 g of 4,4'-diphenylmethane diisocyanate (MDI), 238 g of phenyl isocyanate and 2.5 g of a carbodiimidation catalyst (3-methyl-1-phenyl-2-phospholene-1-oxide, which was used as the carbodiimidation catalyst in all SYNTHESIS EXAMPLES). They were reacted at 70° C. for 5 hours to obtain a solution of a carbodiimide resin (degree of polymerization=5, resin concentration of 50% by weight). It contained the carbodiimide at 204/NCN.

Synthesis Example 2

A mixture of 1,200 g of 4,4'-dicyclohexylmethane diisocyanate (HMDI) and 6 g of a carbodiimidation catalyst were reacted at 180° C. for 21 hours to obtain a 4,4'-dicyclohexylmethane carbodiimide resin with terminal isocyanate (degree of polymerization=6). Thus obtained resin was added with 1027.3 g of toluene to obtain a solution of a carbodiimide resin (resin concentration of 50% by weight). It contained the carbodiimide at 262/NCN.

Synthesis Example 3

A mixture of 1,100.4 g of 4,4'-dicyclohexylmethane diisocyanate (HMDI), 51.7 g of dibutylamine and 5.5 g of a carbodiimidation catalyst were reacted at 180° C. for 36 hours to obtain a carbodiimide resin with a terminal dibutyl group (degree of polymerization=20). Thus obtained resin was added with 976.1 g of toluene to obtain a solution of a carbodiimide resin (resin concentration of 50% by weight). It contained the carbodiimide at 244/NCN.

Synthesis Example 4

A mixture of 1,000 g of 2,6-tolylenediisocyanate (TDI), 402.3 g of polyoxyethylene monomethyl ether having polymerization degree m=12 were reacted at 50° C. for 1 hour, followed by the addition of 10 g of a carbodiimidation catalyst and reaction in 1165.2 g of toluene at 85° C. for 6 hours to obtain a carbodiimide resin with a terminal methyl group (degree of polymerization=15 and resin concentration of 50% by weight). It contained the carbodiimide at 216/NCN.

Synthesis Example 5

A mixture of 800 g of m-tetramethyl xylylene diisocyanate (TMXDI) and 16 g of a carbodiimidation catalyst were reacted at 180° C. for 20 hours to obtain a m-tetramethylxylylene carbodiimide resin with a terminal isocyanate group (degree of polymerization=5). Then 679.8 g of thus obtained carbodiimide was reacted with 177.1 g of sodium hydroxypropanesulfonate at 100° C. for 24 hours, followed by the gradual addition of 571.3 g of distilled water thereto to obtain a yellow brown transparent solution of a carbodiimide resin (resin concentration of 60% by weight). It contained the carbodiimide at 314/NCN.

Synthesis Example 6

A mixture of 800 g of m-tetramethyl xylylene diisocyanate (TMXDI) and 16 g of a carbodiimidation catalyst were reacted at 180° C. for 26 hours to obtain a m-tetramethylxylylene carbodiimide resin with a terminal isocyanate group (degree of polymerization=10). Then 668.9 g of thus obtained carbodiimide was reacted with 333.9 g of polyoxyethylene monomethyl ether having polymerization degree m=12 at 140° C. for 6 hours, followed by the gradual addition of 668.5 g of distilled water thereto to obtain a yellow brown transparent solution of a carbodiimide resin (resin concentration of 60% by weight). It contained the carbodiimide at 336/NCN.

Synthesis Example 7

A mixture of 800 g of 2,6-tolylene diisocyanate (TDI) and 441.4 g of polyoxyethylene monomethyl ether having polymerization degree m=8 were reacted as an initial step at 50° C. for 1 hour, followed by the addition of 8 g of a carbodiimidation catalyst and reaction at 85° C. for 6 hours to obtain a carbodiimide resin with terminal capped (degree of polymerization=7) and the gradual addition of 709.6 g of distilled water thereto to obtain a pale yellow transparent solution of a carbodiimide resin (resin concentration of 60% by weight). It contained the carbodiimide at 265/NCN.

Synthesis Example 8

A mixture of 800 g of 4,4'-dicylohexyl diisocyanate (HMDI) and 4 g of a carbodiimidation catalyst were reacted at 180° C. for 45 hours to obtain a 4,4'-dicyclohexylmethane carbodiimide resin with terminal isocyanate group (degree of polymerization=15). Then 674.0 g of thus obtained carbodiimide was reacted with 264.1 g of polyoxyethylene monomethyl ether having polymerization degree m=15 at 140° C. for 6 hours, followed by the gradual addition of 625.4 g of distilled water thereto to obtain a pale yellow transparent solution of a carbodiimide resin (resin concentration of 60% by weight). It contained the carbodiimide at 328/NCN.

Results of SYNTHESIS EXAMPLES from 1 to 8 of carbodiimide resins are summarized in Table 1 below.

TABLE 1

| Carbodiimide SYNTHESIS EXAMPLES | Diisocyanate as the starting compound | Degree of polymerization of the carbodiimide | Starting material for terminal sealing segment | NCN equivalents | Solvent |
|---|---|---|---|---|---|
| SYNTHESIS EXAMPLE 1 | MDI | 5 | Phenyl isocyanate | 204 | Toluene |
| SYNTHESIS EXAMPLE 2 | HMDI | 6 | Not used (isocyanate) | 262 | Toluene |
| SYNTHESIS EXAMPLE 3 | HMDI | 20 | Dibutylamine | 244 | Toluene |
| SYNTHESIS EXAMPLE 4 | TDI | 15 | Polyoxyethylene monomethyl ether | 216 | Toluene |
| SYNTHESIS EXAMPLE 5 | TMXDI | 5 | Sodium hydroxypropanesulfonate | 314 | Water |
| SYNTHESIS EXAMPLE 6 | TMXDI | 10 | Polyoxyethylene monomethyl ether | 336 | Water |
| SYNTHESIS EXAMPLE 7 | TDI | 7 | Polyoxyethylene monomethyl ether | 265 | Water |
| SYNTHESIS EXAMPLE 8 | HMDI | 15 | Polyoxyethylene monomethyl ether | 328 | Water |

TRIAL PREPARATION OF EXAMPLES OF BASE PARTICLES

Particle Example 1

Comparative Example 1

Into a 500 mL flask, a mixture of the following compounds in ratio shown below were charged all together to be subjected to a reaction in an oil bath kept at 70° C. for about 18 hours under nitrogen gas flow while stirring, followed by cooling as it is and sampling of a reacted resin solution in a stainless tray.

| | |
|---|---|
| Styrene | 60.0 parts |
| Methacrylic acid | 40.0 parts |
| Methanol | 100.0 parts |
| Azobis2-methylbutyronitrile (ABNE) | 1.0 parts |

Then the solution was dried in a dryer at 60° C. for about 24 hours to obtain a carboxyl group containing resin. This resin was crushed and classified using known equipment to obtain A BASE PARTICLE 1.

Particle size distribution of the particles was measured using "Microtrac 9320HRA" from Nikkiso Co., and found volume-average particle diameter to be 12.12 μm. The particles were found to present a non-spherical particle group by morphology observation with SEM (S-2150 from Hitachi Co.). A part of the particles was sampled and named as COMPARATIVE EXAMPLE 1.

Particle Example 2

Comparative Example 2

Into a 500 mL flask, a mixture of the following compounds in ratio shown below were charged all together to be subjected to a reaction in an oil bath kept at 70° C. for about 18 hours under nitrogen gas flow while stirring, followed by cooling as it is and sampling of a reacted resin solution in a stainless tray.

| | |
|---|---|
| Methyl methacrylate | 50.0 parts |
| Acrylic acid | 50.0 parts |
| Methanol | 100.0 parts |
| Azobisisobutyronitrile (AIBN) | 4.0 parts |

Then the solution was dried in a dryer at 60° C. for about 24 hours to obtain a carboxyl group containing resin. This resin was crushed and classified using known equipment to obtain A BASE PARTICLE 2.

Particle size distribution of the particles was measured using "Microtrac 9320HRA" from Nikkiso Co., and found volume-average particle diameter to be 14.38 μm. The particles were found to present a non-spherical particle group by morphology observation with SEM (S-2150 from Hitachi Co.). A part of the particles was sampled and named as COMPARATIVE EXAMPLE 2.

Particle Example 3

Comparative Example 3

A BASE PARTICLE 3 was obtained from a crude particle of polyvinylalcohol (PVA-210, a partially saponificated product from Kuraray Co.) using known crusher and classification equipment.

Particle size distribution of the particles was measured using "Microtrac 9320HRA" from Nikkiso Co., and found volume-average particle diameter to be 48.24 μm. The particles were found to present a non-spherical particle group by morphology observation with SEM (S-2150 from Hitachi Co.). A part of the particles was sampled and named as COMPARATIVE EXAMPLE 3.

Particle Example 4

Comparative Example 4

Into a 500 mL flask, a mixture of the following compounds in ratio shown below were charged all together and purged dissolved oxygen by nitrogen to be subjected to a reaction in an oil bath kept at 75° C. for about 15 hours under nitrogen gas flow while stirring to obtain a solution of a styrene-methacrylate copolymer.

| | |
|---|---|
| Styrene | 48.2 parts |
| Methacrylic acid | 20.6 parts |
| Methanol | 179.8 parts |
| Ethanol | 29.9 parts |
| Water | 59.8 parts |
| Azobis2-methylbutyronitrile (ABNE) | 2.0 parts |
| Solution of a styrene-methacrylate copolymer (wherein a solution of a styrene-methacrylate copolymer was a 40% by weight methanol solution of a copolymer of styrene/2-hydroxyethyl methacrylate = 2:8.) | 75.0 parts |

(wherein a solution of a styrene-methacrylate copolymer was a 40% by weight methanol solution of a copolymer of styrene/2-hydroxyethyl methacrylate=2:8.)

Then this particle solution was washed from about 3 to 5 cycles with a water-methanol (3:7) mixed solution and filtrated using a known vacuum filtration unit, followed by drying under vacuum to obtain A BASE PARTICLE 4. The particle was found to present a spherical particle group with spherical particle index of 1.03 by morphology observation with SEM (S-2150 from Hitachi Co.). Average particle size was found to be 1.56 μm. A part of the particles was sampled and named as COMPARATIVE EXAMPLE 4.

Particle Example 5

Comparative Example 5

Into a 500 mL flask, a mixture of the following compounds in ratio shown below were charged all together and purged dissolved oxygen by nitrogen to be subjected to a reaction in an oil bath kept at 80° C. for about 15 hours under nitrogen gas flow while stirring to obtain a particle solution of a styrene-methacrylate copolymer.

| | |
|---|---|
| Styrene | 48.2 parts |
| Methacrylic acid | 20.6 parts |
| Methanol | 220.8 parts |
| Water | 55.2 parts |
| Azobisisobutyronitrile (AIBN) | 1.6 parts |
| Solution of a styrene-methacrylate copolymer (wherein a solution of a styrene-methacrylate copolymer was a 40% by weight methanol solution of a copolymer of styrene/2-hydroxyethyl methacrylate = 2:8.) | 62.8 parts |

(wherein a solution of a styrene-methacrylate copolymer was a 40% by weight methanol solution of a copolymer of styrene/2-hydroxyethyl methacrylate=2:8.)

Then this particle solution was washed from about 3 to 5 cycles with a water-methanol (3:7) mixed solution and filtrated using a known vacuum filtration unit, followed by drying under vacuum to obtain A BASE PARTICLE 5. The particle was found to present a spherical particle group with spherical particle index of 1.05 by morphology observation with SEM (S-2150 from Hitachi Co.). Average particle size was found to be 5.82 μm. A part of the particles was sampled and named as COMPARATIVE EXAMPLE 5.

Particle Example 6

Comparative Example 6

Into a 500 mL flask, a mixture of the following compounds in ratio shown below were charged all together and purged dissolved oxygen by nitrogen to be subjected to a reaction in an oil bath kept at 80° C. for about 15 hours under nitrogen gas flow while stirring to obtain a solution of a styrene-acrylic acid copolymer.

| | |
|---|---|
| Styrene | 48.2 parts |
| Acrylic acid | 20.6 parts |
| Methanol | 162.0 parts |
| Ethanol | 54.0 parts |
| Water | 54.0 parts |
| Azobis2-methylbutyronitrile (ABNE) | 3.1 parts |
| Solution of a styrene-methacrylate copolymer (wherein a solution of a styrene-methacrylate copolymer was a 40% by weight methanol solution of a copolymer of styrene/2-hydroxyethyl methacrylate = 2:8.) | 60.0 parts |

(wherein a solution of a styrene-methacrylate copolymer was a 40% by weight methanol solution of a copolymer of styrene/2-hydroxyethyl methacrylate=2:8.)

Then this particle solution was washed from about 3 to 5 cycles with a water-methanol (3:7) mixed solution and filtrated using a known vacuum filtration unit, followed by drying under vacuum to obtain A BASE PARTICLE 6. The particle was found to present a spherical particle group with spherical particle index of 1.07 by morphology observation with SEM (S-2150 from Hitachi Co.). Average particle size was found to be 12.91 μm. A part of the particles was sampled and named as COMPARATIVE EXAMPLE 6.

Particle Example 7

Comparative Example 7

Into a 500 mL flask, a mixture of the following compounds in ratio shown below were charged all together and purged dissolved oxygen by nitrogen to be subjected to a reaction in an oil bath kept at 62° C. for about 15 hours under nitrogen gas flow while stirring to obtain a solution of a styrene-methacrylate copolymer.

| | |
|---|---|
| Styrene | 61.9 parts |
| Methacrylic acid | 6.9 parts |
| Methanol | 90.3 parts |
| Azobisisobutyronitrile (AIBN) | 1.6 parts |
| Solution of a styrene-methacrylate copolymer (wherein a solution of a styrene-methacrylate copolymer was a 40% by weight methanol solution of a copolymer of styrene/2-hydroxyethyl methacrylate = 2:8.) | 90.7 parts |

(wherein a solution of a styrene-methacrylate copolymer was a 40% by weight methanol solution of a copolymer of styrene/2-hydroxyethyl methacrylate=2:8.)

Then this particle solution was washed from about 3 to 5 cycles with methanol and filtrated using a known vacuum filtration unit, followed by drying under vacuum to obtain A BASE PARTICLE 7. The particle was found to present a spherical particle group with spherical particle index of 1.03 by morphology observation with SEM (S-2150 from Hitachi Co.). Average particle size was found to be 6.83 μm. A part of the particles was sampled and named as COMPARATIVE EXAMPLE 7.

Particle Example 8

Comparative Example 8

Into a 1000 mL flask, a mixture of the following compounds in ratio shown below were charged all together and purged dissolved oxygen by nitrogen to be subjected to a reaction in an oil bath kept at 70° C. for about 15 hours under nitrogen gas flow while stirring to obtain a solution of a styrene-methacrylate copolymer.

| | |
|---|---|
| Styrene | 133.4 parts |
| Methacrylic acid | 4.2 parts |
| Methanol | 180.6 parts |
| Azobisisobutyronitrile (AIBN) | 4.0 parts |
| Solution of a styrene-methacrylate copolymer (wherein a solution of a styrene-methacrylate copolymer was a 40% by weight methanol solution of a copolymer of styrene/2-hydroxyethyl methacrylate = 2:8.) | 181.4 parts |

(wherein a solution of a styrene-methacrylate copolymer was a 40% by weight methanol solution of a copolymer of styrene/2-hydroxyethyl methacrylate=2:8.)

Then this particle solution was washed from about 3 to 5 cycles with methanol (3:7) and filtrated using a known vacuum filtration unit, followed by drying under vacuum to obtain A BASE PARTICLE 8. The particle was found to present a spherical particle group with spherical particle index of 1.02 by morphology observation with SEM (S-2150 from Hitachi Co.). Average particle size was found to be 4.43 μm. A part of the particles was sampled and named as COMPARATIVE EXAMPLE 8.

Results of PREPARED PARTICLE EXAMPLES from 1 to 8' are summarized in Table 2 below.

TABLE 2

| | Functional group in the particle | Equivalents of the functional group | Starting compounds used |
|---|---|---|---|
| PARTICLE EXAMPLE 1 | Carboxyl | 215/COOH | Styrene and methacrylic acid |
| PARTICLE EXAMPLE 2 | Carboxyl | 144/COOH | Methyl methacrylate and acrylic acid |
| PARTICLE EXAMPLE 3 | Hydroxyl | 56/OH | PVA |
| PARTICLE EXAMPLE 4 | Carboxyl | 287/COOH | Styrene and methacrylic acid |
| PARTICLE EXAMPLE 5 | Carboxyl | 287/COOH | Styrene and methacrylic acid |
| PARTICLE EXAMPLE 6 | Carboxyl | 240/COOH | Styrene and acrylic acid |
| PARTICLE EXAMPLE 7 | Carboxyl | 860/COOH | Styrene and methacrylic acid |
| PARTICLE EXAMPLE 8 | Carboxyl | 2867/COOH | Styrene and methacrylic acid |

SYNTHESIS EXAMPLES OF COMPOSITE PARTICLES

Example 1

Into a 300 mL flask, a mixture of the following compounds in ratio shown below were charged all together to be subjected to a reaction in an oil bath kept at 35° C. for about 15 hours under nitrogen gas flow while stirring to prepare a solution of a carbodiimide-containing a composite particle.

| | |
|---|---|
| A BASE PARTICLE 1 | 8.0 parts |
| Carbodiime resin solution prepared in SYNTHESIS EXAMPLE 1 | 60.0 parts |
| Toluene | 90.0 parts |

Next, the solution was treated by around 3 to 5 cycles of washing with toluene and filtration by a known vacuum filtration unit, and dried under vacuum to prepare a composite particle. The particle showed an absorption band peak relevant to a carbodiimide group at a wavelength of around 2150 (1/cm), determined by a Fourier transform infrared spectrometer (Shimadzu Corp.'s FT-IR8200PC).

Example 2

Into a 300 mL flask, a mixture of the following compounds in ratio shown below were charged all together to be subjected to a reaction in an oil bath kept at 55° C. for about 15 hours under nitrogen gas flow while stirring to prepare a solution of a carbodiimide-containing a composite particle.

| | |
|---|---|
| A BASE PARTICLE 1 | 8.0 parts |
| Carbodiimide resin solution prepared in SYNTHESIS EXAMPLE 2 | 78.0 parts |
| Toluene | 52.0 parts |

Next, the solution was treated by around 3 to 5 cycles of washing with toluene and filtration by a known vacuum filtration unit, and dried under vacuum to prepare a composite particle. The particle showed an absorption band peak relevant to a carbodiimide group at a wavelength of around 2150 (1/cm), determined by a Fourier transform infrared spectrometer (Shimadzu Corp.'s FT-IR8200PC).

Example 3

Into a 300 mL flask, a mixture of the following compounds in ratio shown below were charged all together to be subjected to a reaction in an oil bath kept at 50° C. for about 15 hours under nitrogen gas flow while stirring to prepare a solution of a carbodiimide-containing a composite particle.

| | |
|---|---|
| A BASE PARTICLE 1 | 5.0 parts |
| Carbodiimide resin solution prepared in SYNTHESIS EXAMPLE 5 | 48.0 parts |
| Water | 39.0 parts |
| Methanol | 58.0 parts |

Next, the solution was treated by around 3 to 5 cycles of washing with a water-methanol (3:7) mixed solution and filtration by a known vacuum filtration unit, and dried under vacuum to prepare a composite particle. The particle showed an absorption band peak relevant to a carbodiimide group at a wavelength of around 2150 (1/cm), determined by a Fourier transform infrared spectrometer (Shimadzu Corp.'s FT-IR8200PC).

Example 4

Into a 300 mL flask, a mixture of the following compounds in ratio shown below were charged all together to be subjected to a reaction in an oil bath kept at 40° C. for about 15 hours under nitrogen gas flow while stirring to prepare a solution of a carbodiimide-containing composite particle.

| | |
|---|---|
| A BASE PARTICLE 2 | 8.0 parts |
| Carbodiimide resin solution prepared in SYNTHESIS EXAMPLE 1 | 46.0 parts |
| Toluene | 69.0 parts |

Next, the solution was treated by around 3 to 5 cycles of washing with toluene and filtration by a known vacuum filtration unit, and dried under a vacuum to prepare a composite particle. The particle showed an absorption band peak relevant to a carbodiimide group at a wavelength of around 2150 (1/cm), determined by a Fourier transform infrared spectrometer (Shimadzu Corp.'s FT-IR8200PC).

Example 5

Into a 300 mL flask, a mixture of the following compounds in ratio shown below were charged all together to be subjected to a reaction in an oil bath kept at 50° C. for about 15 hours under nitrogen gas flow while stirring to prepare a solution of a carbodiimide-containing composite particle.

| | |
|---|---|
| A BASE PARTICLE 2 | 5.0 parts |
| Carbodiimide resin solution prepared in SYNTHESIS EXAMPLE 2 | 72.0 parts |
| Toluene | 48.0 parts |

Next, the solution was treated by around 3 to 5 cycles of washing with toluene and filtration by a known vacuum filtration unit, and dried under a vacuum to prepare a composite particle. The particle showed an absorption band peak relevant to a carbodiimide group at a wavelength of around 2150 (1/cm), determined by a Fourier transform infrared spectrometer (Shimadzu Corp.'s FT-IR8200PC).

Example 6

Into a 300 mL flask, a mixture of the following compounds in ratio shown below were charged all together to be subjected to a reaction in an oil bath kept at 45° C. for about 15 hours under nitrogen gas flow while stirring to prepare a solution of a carbodiimide-containing composite particle.

| | |
|---|---|
| A BASE PARTICLE 2 | 5.0 parts |
| Carbodiimide resin solution prepared in SYNTHESIS EXAMPLE 7 | 62.0 parts |
| Water | 61.0 parts |

Next, the solution was treated by around 3 to 5 cycles of washing with water and filtration by a known vacuum filtration unit, and dried under a vacuum to prepare a composite particle. The particle showed an absorption band peak relevant to a carbodiimide group at a wavelength of around 2150 (1/cm), determined by a Fourier transform infrared spectrometer (Shimadzu Corp.'s FT-IR8200PC).

Example 7

Into a 300 mL flask, a mixture of the following compounds in ratio shown below were charged all together to be subjected to a reaction in an oil bath kept at 90° C. for about 15 hours under nitrogen gas flow while stirring to prepare a solution of a carbodiimide-containing composite particle.

| | |
|---|---|
| A BASE PARTICLE 3 | 2.0 parts |
| Carbodiimide resin solution prepared in SYNTHESIS EXAMPLE 1 | 52.2 parts |
| Toluene | 78.3 parts |

Next, the solution was treated by around 3 to 5 cycles of washing with toluene and filtration by a known vacuum filtration unit, and dried under a vacuum to prepare a composite particle. The particle showed an absorption band peak relevant to a carbodiimide group at a wavelength of around 2150 (1/cm), determined by a Fourier transform infrared spectrometer (Shimadzu Corp.'s FT-IR8200PC).

Example 8

Into a 300 mL flask, a mixture of the following compounds in ratio shown below were charged all together to be subjected to a reaction in an oil bath kept at 105° C. for about 15 hours under nitrogen gas flow while stirring to prepare a solution of a carbodiimide-containing composite particle.

| | |
|---|---|
| A BASE PARTICLE 3 | 2.0 parts |
| Carbodiimide resin solution prepared in SYNTHESIS EXAMPLE 2 | 112.0 parts |
| Toluene | 75.0 parts |

Next, the solution was treated by around 3 to 5 cycles of washing with toluene and filtration by a known vacuum filtration unit, and dried under a vacuum to prepare a composite particle. The particle showed an absorption band peak relevant to a carbodiimide group at a wavelength of around 2150 (1/cm), determined by a Fourier transform infrared spectrometer (Shimadzu Corp.'s FT-IR8200PC).

Example 9

Into a 300 mL flask, a mixture of the following compounds in ratio shown below were charged all together to be subjected to a reaction in an oil bath kept at 50° C. for about 15 hours under nitrogen gas flow while stirring to prepare a solution of a carbodiimide-containing composite particle.

| | |
|---|---|
| A BASE PARTICLE 4 | 6.0 parts |
| Carbodiimide resin solution prepared in SYNTHESIS EXAMPLE 5 | 54.7 parts |
| Water | 43.7 parts |
| Methanol | 56.6 parts |

Next, the solution was treated by around 3 to 5 cycles of washing with a water-methanol mixed solution (3:7) and filtration by a known vacuum filtration unit, and dried under a vacuum to prepare a composite particle. The particle showed an absorption band peak relevant to a carbodiimide group at a wavelength of around 2150 (1/cm), determined by a Fourier transform infrared spectrometer (Shimadzu Corp.'s FT-IR8200PC).

Example 10

Into a 300 mL flask, a mixture of the following compounds in ratio shown below were charged all together to be subjected to a reaction in an oil bath kept at 50° C. for about 15 hours under nitrogen gas flow while stirring to prepare a solution of a carbodiimide-containing composite particle.

| | |
|---|---|
| A BASE PARTICLE 4 | 80 parts |
| Carbodiimide resin solution prepared in SYNTHESIS EXAMPLE 6 | 56.9 parts |
| Water | 45.6 parts |
| Methanol | 68.3 parts |

Next, the solution was treated by around 3 to 5 cycles of washing with a water-methanol mixed solution (3:7) and filtration by a known vacuum filtration unit, and dried under a vacuum to prepare a composite particle. The particle showed an absorption band peak relevant to a carbodiimide group at a wavelength of around 2150 (1/cm), determined by a Fourier transform infrared spectrometer (Shimadzu Corp.'s FT-IR8200PC).

Example 11

Into a 300 mL flask, a mixture of the following compounds in ratio shown below were charged all together to be subjected to a reaction in an oil bath kept at 40° C. for about 15 hours under nitrogen gas flow while stirring to prepare a solution of a carbodiimide-containing composite particle.

| | |
|---|---|
| A BASE PARTICLE 4 | 6.0 parts |
| Carbodiimide resin solution prepared in SYNTHESIS EXAMPLE 7 | 69.3 parts |
| Water | 55.3 parts |
| Methanol | 83.0 parts |

Next, the solution was treated by around 3 to 5 cycles of washing with a water-methanol mixed solution (3:7) and filtration by a known vacuum filtration unit, and dried under a vacuum to prepare a composite particle. The particle showed an absorption band peak relevant to a carbodiimide group at a wavelength of around 2150 (1/cm), determined by a Fourier transform infrared spectrometer (Shimadzu Corp.'s FT-IR8200PC).

Example 12

Into a 300 mL flask, a mixture of the following compounds in ratio shown below were charged all together to be subjected to a reaction in an oil bath kept at 45° C. for about 15 hours under nitrogen gas flow while stirring to prepare a solution of a carbodiimide-containing composite particle.

| | |
|---|---|
| A BASE PARTICLE 5 | 6.0 parts |
| Carbodiimide resin solution prepared in SYNTHESIS EXAMPLE 5 | 43.8 parts |
| Water | 35.0 parts |
| Methanol | 52.6 parts |

Next, the solution was treated by around 3 to 5 cycles of washing with a water-methanol mixed solution (3:7) and filtration by a known vacuum filtration unit, and dried under a vacuum to prepare a composite particle. The particle showed an absorption band peak relevant to a carbodiimide group at a wavelength of around 2150 (1/cm), determined by a Fourier transform infrared spectrometer (Shimadzu Corp.'s FT-IR8200PC).

Example 13

Into a 300 mL flask, a mixture of the following compounds in ratio shown below were charged all together to be subjected to a reaction in an oil bath kept at 45° C. for about 15 hours under nitrogen gas flow while stirring to prepare a solution of a carbodiimide-containing composite particle.

| A BASE PARTICLE 5 | 6.0 parts |
| --- | --- |
| Carbodiimide resin solution prepared in SYNTHESIS EXAMPLE 6 | 46.8 parts |
| Water | 37.5 parts |
| Methanol | 56.2 parts |

Next, the solution was treated by around 3 to 5 cycles of washing with a water-methanol mixed solution (3:7) and filtration by a known vacuum filtration unit, and dried under a vacuum to prepare a composite particle. The particle showed an absorption band peak relevant to a carbodiimide group at a wavelength of around 2150 (1/cm), determined by a Fourier transform infrared spectrometer (Shimadzu Corp.'s FT-IR8200PC).

Example 14

Into a 300 mL flask, a mixture of the following compounds in ratio shown below were charged all together to be subjected to a reaction in an oil bath kept at 35° C. for about 15 hours under nitrogen gas flow while stirring to prepare a solution of a carbodiimide-containing composite particle.

| A BASE PARTICLE 5 | 7.0 parts |
| --- | --- |
| Carbodiimide resin solution prepared in SYNTHESIS EXAMPLE 7 | 32.3 parts |
| Water | 25.9 parts |
| Methanol | 38.8 parts |

Next, the solution was treated by around 3 to 5 cycles of washing with a water-methanol mixed solution (3:7) and filtration by a known vacuum filtration unit, and dried under a vacuum to prepare a composite particle. The particle showed an absorption band peak relevant to a carbodiimide group at a wavelength of around 2150 (1/cm), determined by a Fourier transform infrared spectrometer (Shimadzu Corp.'s FT-IR8200PC).

Example 15

Into a 300 mL flask, a mixture of the following compounds in ratio shown below were charged all together to be subjected to a reaction in an oil bath kept at 45° C. for about 15 hours under nitrogen gas flow while stirring to prepare a solution of a carbodiimide-containing composite particle.

| A BASE PARTICLE 6 | 7.0 parts |
| --- | --- |
| Carbodiimide resin solution prepared in SYNTHESIS EXAMPLE 5 | 45.8 parts |
| Water | 36.7 parts |
| Methanol | 55.0 parts |

Next, the solution was treated by around 3 to 5 cycles of washing with a water-methanol mixed solution (3:7) and filtration by a known vacuum filtration unit, and dried under a vacuum to prepare a composite particle. The particle showed an absorption band peak relevant to a carbodiimide group at a wavelength of around 2150 (1/cm), determined by a Fourier transform infrared spectrometer (Shimadzu Corp.'s FT-IR8200PC).

Example 16

Into a 300 mL flask, a mixture of the following compounds in ratio shown below were charged all together to be subjected to a reaction in an oil bath kept at 50° C. for about 15 hours under nitrogen gas flow while stirring to prepare a solution of a carbodiimide-containing composite particle.

| A BASE PARTICLE 6 | 7.0 parts |
| --- | --- |
| Carbodiimide resin solution prepared in SYNTHESIS EXAMPLE 6 | 49.0 parts |
| Water | 39.2 parts |
| Methanol | 58.8 parts |

Next, the solution was treated by around 3 to 5 cycles of washing with a water-methanol mixed solution (3:7) and filtration by a known vacuum filtration unit, and dried under a vacuum to prepare a composite particle. The particle showed an absorption band peak relevant to a carbodiimide group at a wavelength of around 2150 (1/cm), determined by a Fourier transform infrared spectrometer (Shimadzu Corp.'s FT-IR8200PC).

Example 17

Into a 300 mL flask, a mixture of the following compounds in ratio shown below were charged all together to be subjected to a reaction in an oil bath kept at 40° C. for about 15 hours under nitrogen gas flow while stirring to prepare a solution of a carbodiimide-containing composite particle.

| A BASE PARTICLE 6 | 6.0 parts |
| --- | --- |
| Carbodiimide resin solution prepared in SYNTHESIS EXAMPLE 7 | 33.2 parts |
| Water | 26.5 parts |
| Methanol | 39.8 parts |

Next, the solution was treated by around 3 to 5 cycles of washing with a water-methanol mixed solution (3:7) and filtration by a known vacuum filtration unit, and dried under a vacuum to prepare a composite particle. The particle showed an absorption band peak relevant to a carbodiimide group at a wavelength of around 2150 (1/cm), determined by a Fourier transform infrared spectrometer (Shimadzu Corp.'s FT-IR8200PC).

Example 18

Into a 300 mL flask, a mixture of the following compounds in ratio shown below were charged all together to be subjected to a reaction in an oil bath kept at 45° C. for about 15 hours under nitrogen gas flow while stirring to prepare a solution of a carbodiimide-containing composite particle.

| A BASE PARTICLE 1 | 9.0 parts |
| --- | --- |
| Carbodiimide resin solution prepared in SYNTHESIS EXAMPLE 3 | 41.0 parts |
| Toluene | 61.5 parts |

Next, the solution was treated by around 3 to 5 cycles of washing with toluene and filtration by a known vacuum filtration unit, and dried under a vacuum to prepare a composite particle. The particle showed an absorption band peak relevant to a carbodiimide group at a wavelength of around 2150 (1/cm), determined by a Fourier transform infrared spectrometer (Shimadzu Corp.'s FT-IR8200PC).

Example 19

Into a 300 mL flask, a mixture of the following compounds in ratio shown below were charged all together to be subjected to a reaction in an oil bath kept at 40° C. for about 15 hours under nitrogen gas flow while stirring to prepare a solution of a carbodiimide-containing composite particle.

| | |
|---|---|
| A BASE PARTICLE 2 | 8.0 parts |
| Carbodiimide resin solution prepared in SYNTHESIS EXAMPLE 4 | 48.0 parts |
| Toluene | 72.0 parts |

Next, the solution was treated by around 3 to 5 cycles of washing with toluene and filtration by a known vacuum filtration unit, and dried under a vacuum to prepare a composite particle. The particle showed an absorption band peak relevant to a carbodiimide group at a wavelength of around 2150 (1/cm), determined by a Fourier transform infrared spectrometer (Shimadzu Corp.'s FT-IR8200PC).

Example 20

Into a 300 mL flask, a mixture of the following compounds in ratio shown below were charged all together to be subjected to a reaction in an oil bath kept at 50° C. for about 15 hours under nitrogen gas flow while stirring to prepare a solution of a carbodiimide-containing composite particle.

| | |
|---|---|
| A BASE PARTICLE 4 | 15.0 parts |
| Carbodiimide resin solution prepared in SYNTHESIS EXAMPLE 8 | 68.6 parts |
| Water | 102.9 parts |

Next, the solution was treated by around 3 to 5 cycles of washing with water and filtration by a known vacuum filtration unit, and dried under a vacuum to prepare a composite particle. The particle showed an absorption band peak relevant to a carbodiimide group at a wavelength of around 2150 (1/cm), determined by a Fourier transform infrared spectrometer (Shimadzu Corp.'s FT-IR8200PC).

Example 21

Into a 300 mL flask, a mixture of the following compounds in ratio shown below were charged all together to be subjected to a reaction in an oil bath kept at 50° C. for about 15 hours under nitrogen gas flow while stirring to prepare a solution of a carbodiimide-containing composite particle.

| | |
|---|---|
| A BASE PARTICLE 5 | 12.0 parts |
| Carbodiimide resin solution prepared in SYNTHESIS EXAMPLE 8 | 54.8 parts |
| Water | 109.6 parts |

Next, the solution was treated by around 3 to 5 cycles of washing with water and filtration by a known vacuum filtration unit, and dried under a vacuum to prepare a composite particle. The particle showed an absorption band peak relevant to a carbodiimide group at a wavelength of around 2150 (1/cm), determined by a Fourier transform infrared spectrometer (Shimadzu Corp.'s FT-IR8200PC).

Example 22

Into a 300 mL flask, a mixture of the following compounds in ratio shown below were charged all together to be subjected to a reaction in an oil bath kept at 45° C. for about 15 hours under nitrogen gas flow while stirring to prepare a solution of a carbodiimide-containing composite particle.

| | |
|---|---|
| A BASE PARTICLE 6 | 12.0 parts |
| Carbodiimide resin solution prepared in SYNTHESIS EXAMPLE 8 | 54.7 parts |
| Water | 109.3 parts |

Next, the solution was treated by around 3 to 5 cycles of washing with water and filtration by a known vacuum filtration unit, and dried under a vacuum to prepare a composite particle. The particle showed an absorption band peak relevant to carbodiimide group at a wavelength of around 2150 (1/cm), determined by a Fourier transform infrared spectrometer (Shimadzu Corp.'s FT-IR8200PC).

Example 23

Into a 300 mL flask, a mixture of the following compounds in ratio shown below were charged all together to be subjected to a reaction in an oil bath kept at 55° C. for about 15 hours under nitrogen gas flow while stirring to prepare a solution of a carbodiimide-containing composite particle.

| | |
|---|---|
| A BASE PARTICLE 7 | 12.0 parts |
| Carbodiimide resin solution prepared in SYNTHESIS EXAMPLE 5 | 29.3 parts |
| Water | 38.2 parts |
| Methanol | 49.9 parts |

Next, the solution was treated by around 3 to 5 cycles of washing with a water-methanol mixed solution (3:7) and filtration by a known vacuum filtration unit, and dried under a vacuum to prepare a composite particle. The particle showed an absorption band peak relevant to a carbodiimide group at a wavelength of around 2150 (1/cm), determined by a Fourier transform infrared spectrometer (Shimadzu Corp.'s FT-IR8200PC).

Example 24

Into a 300 mL flask, a mixture of the following compounds in ratio shown below were charged all together to be subjected to a reaction in an oil bath kept at 50° C. for about 15 hours under nitrogen gas flow while stirring to prepare a solution of a carbodiimide-containing composite particle.

| | |
|---|---|
| A BASE PARTICLE 7 | 14.0 parts |
| Carbodiimide resin solution prepared in SYNTHESIS EXAMPLE 6 | 27.4 parts |
| Water | 35.5 parts |
| Methanol | 46.5 parts |

Next, the solution was treated by around 3 to 5 cycles of washing with a water-methanol mixed solution (3:7) and filtration by a known vacuum filtration unit, and dried under a vacuum to prepare a composite particle. The particle showed an absorption band peak relevant to a carbodiimide group at a wavelength of around 2150 (1/cm), determined by a Fourier transform infrared spectrometer (Shimadzu Corp.'s FT-IR8200PC).

Example 25

Into a 300 mL flask, a mixture of the following compounds in ratio shown below were charged all together to be subjected to a reaction in an oil bath kept at 40° C. for about 15 hours under nitrogen gas flow while stirring to prepare a solution of a carbodiimide-containing composite particle.

| | |
|---|---|
| A BASE PARTICLE 7 | 16.0 parts |
| Carbodiimide resin solution prepared in SYNTHESIS EXAMPLE 7 | 32.9 parts |
| Water | 42.6 parts |
| Methanol | 55.8 parts |

Next, the solution was treated by around 3 to 5 cycles of washing with a water-methanol mixed solution (3:7) and filtration by a known vacuum filtration unit, and dried under a vacuum to prepare a composite particle. The particle showed an absorption band peak relevant to a carbodiimide group at a wavelength of around 2150 (1/cm), determined by a Fourier transform infrared spectrometer (Shimadzu Corp.'s FT-IR8200PC).

Example 26

Into a 300 mL flask, a mixture of the following compounds in ratio shown below were charged all together to be subjected to a reaction in an oil bath kept at 50° C. for about 15 hours under nitrogen gas flow while stirring to prepare a solution of a carbodiimide-containing composite particle.

| | |
|---|---|
| A BASE PARTICLE 7 | 16.0 parts |
| Carbodiimide resin solution prepared in SYNTHESIS EXAMPLE 8 | 20.3 parts |
| Water | 101.7 parts |

Next, the solution was treated by around 3 to 5 cycles of washing with a water and filtration by a known vacuum filtration unit, and dried under a vacuum to prepare a composite particle. The particle showed an absorption band peak relevant to a carbodiimide group at a wavelength of around 2150 (1/cm), determined by a Fourier transform infrared spectrometer (Shimadzu Corp.'s FT-IR8200PC).

SYNTHESIS EXAMPLES OF COMPARATIVE PARTICLES

Comparative Example 9

Into a 300 mL flask, a mixture of the following compounds in ratio shown below were charged all together to be subjected to a reaction in an oil bath kept at 45° C. for about 15 hours under nitrogen gas flow while stirring to prepare a solution of a carbodiimide-containing composite particle.

| | |
|---|---|
| A BASE PARTICLE 8 | 12.0 parts |
| Carbodiimide resin solution prepared in SYNTHESIS EXAMPLE 5 | 9.2 parts |

-continued

| | |
|---|---|
| Water | 48.5 parts |
| Methanol | 52.2 parts |

Next, the solution was treated by around 3 to 5 cycles of washing with a water-methanol mixed solution (3:7) and filtration by a known vacuum filtration unit, and dried under a vacuum to prepare a composite particle. The particle showed very small absorption band peak relevant to a carbodiimide group at a wavelength of around 2150 (1/cm), determined by a Fourier transform infrared spectrometer (Shimadzu Corp.'s FT-IR8200PC).

Comparative Example 10

Into a 300 mL flask, a mixture of the following compounds in ratio shown below were charged all together to be subjected to a reaction in an oil bath kept at 50° C. for about 15 hours under nitrogen gas flow while stirring to prepare a solution of a carbodiimide-containing composite particle.

| | |
|---|---|
| A BASE PARTICLE 8 | 12.0 parts |
| Carbodiimide resin solution prepared in SYNTHESIS EXAMPLE 6 | 7.0 parts |
| Water | 37.1 parts |
| Methanol | 39.9 parts |

Next, the solution was treated by around 3 to 5 cycles of washing with a water-methanol mixed solution (3:7) and filtration by a known vacuum filtration unit, and dried under a vacuum to prepare a composite particle. The particle showed very small absorption band peak relevant to carbodiimide group at a wavelength of around 2150 (1/cm), determined by a Fourier transform infrared spectrometer (Shimadzu Corp.'s FT-IR8200PC).

Comparative Example 11

Into a 300 mL flask, a mixture of the following compounds in ratio shown below were charged all together to be subjected to a reaction in an oil bath kept at 35° C. for about 15 hours under nitrogen gas flow while stirring to prepare a solution of a carbodiimide-containing composite particle.

| | |
|---|---|
| A BASE PARTICLE 8 | 15.0 parts |
| Carbodiimide resin solution prepared in SYNTHESIS EXAMPLE 7 | 6.9 parts |
| Water | 36.6 parts |
| Methanol | 39.4 parts |

Next, the solution was treated by around 3 to 5 cycles of washing with a water-methanol mixed solution (3:7) and filtration by a known vacuum filtration unit, and dried under a vacuum to prepare a composite particle. The particle showed very small absorption band peak relevant to carbodiimide group at a wavelength of around 2150 (1/cm), determined by a Fourier transform infrared spectrometer (Shimadzu Corp.'s FT-IR8200PC).

Comparative Example 12

Into a 300 mL flask, a mixture of the following compounds in ratio shown below were charged all together to be subjected to a reaction in an oil bath kept at 50° C. for about 15 hours under nitrogen gas flow while stirring to prepare a solution of a carbodiimide-containing composite particle.

| A BASE PARTICLE 8 | 15.0 parts |
| --- | --- |
| Carbodiimide resin solution prepared in SYNTHESIS EXAMPLE 8 | 5.7 parts |
| Water | 62.9 parts |

Next, the solution was treated by around 3 to 5 cycles of washing with a water and filtration by a known vacuum filtration unit, and dried under a vacuum to prepare a composite particle. The particle showed very small absorption band peak relevant to a carbodiimide group at a wavelength of around 2150 (1/cm), determined by a Fourier transform infrared spectrometer (Shimadzu Corp.'s FT-IR8200PC).

Comparative Example 13

Into a 300 mL flask, a mixture of the following compounds in ratio shown below were charged all together to be subjected to a reaction in an oil bath kept at 50° C. for about 15 hours under nitrogen gas flow while stirring to prepare a solution of a carbodiimide-containing composite particle.

| A BASE PARTICLE 8 | 10.0 parts |
| --- | --- |
| Carbodiimide resin solution prepared in SYNTHESIS EXAMPLE 8 | 7.6 parts |
| Water | 83.8 parts |

Next, the solution was treated by around 3 to 5 cycles of washing with a water and filtration by a known vacuum filtration unit, and dried under a vacuum to prepare a composite particle. The particle showed very small absorption band peak relevant to a carbodiimide group at a wavelength of around 2150 (1/cm), determined by a Fourier transform infrared spectrometer (Shimadzu Corp.'s FT-IR8200PC).

Comparative Example 14

Into a 300 mL flask, a mixture of the following compounds in ratio shown below were charged all together to be subjected to a reaction in an oil bath kept at 35° C. for about 15 hours under nitrogen gas flow while stirring to prepare a solution of a carbodiimide-containing composite particle.

| A BASE PARTICLE 8 | 10.0 parts |
| --- | --- |
| Carbodiimide resin solution prepared in SYNTHESIS EXAMPLE 7 | 9.2 parts |
| Water | 49.0 parts |
| Methanol | 52.6 parts |

Next, the solution was treated by around 3 to 5 cycles of washing with a water-methanol mixed solution (3:7) and filtration by a known vacuum filtration unit, and dried under a vacuum to prepare a composite particle. The particle showed very small absorption band peak relevant to a carbodiimide group at a wavelength of around 2150 (1/cm), determined by a Fourier transform infrared spectrometer (Shimadzu Corp.'s FT-IR8200PC).

Comparative Example 15

Into a 300 mL flask, a mixture of the following compounds in ratio shown below were charged all together to be subjected to a reaction in an oil bath kept at 50° C. for about 15 hours under nitrogen gas flow while stirring to prepare a solution of a carbodiimide-containing composite particle.

| A BASE PARTICLE 8 | 10.0 parts |
| --- | --- |
| Carbodiimide resin solution prepared in SYNTHESIS EXAMPLE 6 | 9.8 parts |
| Water | 51.7 parts |
| Methanol | 55.7 parts |

Next, the solution was treated by around 3 to 5 cycles of washing with a water-methanol mixed solution (3:7) and filtration by a known vacuum filtration unit, and dried under a vacuum to prepare a composite particle. The particle showed very small absorption band peak relevant to carbodiimide group at a wavelength of around 2150 (1/cm), determined by a Fourier transform infrared spectrometer (Shimadzu Corp.'s FT-IR8200PC).

Results of EXAMPLES from 1 to 26 and COMPARATIVE EXAMPLES from 1 to 15 are summarized in Tables 3 and 4 below.

TABLE 3

| EXAMPLES | Starting diisocyanate compound for carbodiimidation | Content of carbodiimide (equivalents) (NCN/ functional group) | Reaction temperature (° C.) | Solvents for carbodiimide resin |
| --- | --- | --- | --- | --- |
| 1 | MDI | 4 | 35 | Toluene |
| 2 | HMDI | 4 | 55 | Toluene |
| 3 | TMXDI | 4 | 50 | Water/methanol, mixture |
| 4 | MDI | 2 | 40 | Toluene |
| 5 | HMDI | 4 | 50 | Toluene |
| 6 | TDI | 4 | 45 | Water |
| 7 | MDI | 3 | 90 | Toluene |
| 8 | HMDI | 6 | 105 | Toluene |
| 9 | TMXDI | 5 | 50 | Water/methanol, mixture |
| 10 | TMXDI | 5 | 50 | Water/methanol, mixture |
| 11 | TDI | 5 | 40 | Water/methanol, mixture |
| 12 | TMXDI | 4 | 45 | Water/methanol, mixture |
| 13 | TMXDI | 4 | 45 | Water/methanol, mixture |
| 14 | TDI | 3 | 35 | Water/methanol, mixture |
| 15 | TMXDI | 3 | 45 | Water/methanol, mixture |
| 16 | TMXDI | 3 | 50 | Water/methanol, mixture |
| 17 | TDI | 3 | 40 | Water/methanol, mixture |
| 18 | HMDI | 2 | 45 | Toluene |
| 19 | TMXDI | 2 | 40 | Toluene |
| 20 | HMDI | 2 | 50 | Water |
| 21 | HMDI | 2 | 50 | Water |
| 22 | HMDI | 2 | 45 | Water |
| 23 | TMXDI | 4 | 55 | Water/methanol, mixture |
| 24 | TMXDI | 3 | 50 | Water/methanol, mixture |
| 25 | TDI | 4 | 40 | Water/methanol, mixture |
| 26 | HMDI | 2 | 50 | Water |

TABLE 4

| COMPARATIVE EXAMPLES | Starting diisocyanate compound for carbodiimidation | Content of carbodiimide (equivalents), (NCN/functional group) | Reaction temperature (° C.) | Solvents |
|---|---|---|---|---|
| 1 | No carbodiimide was contained in the particle | | — | — |
| 2 | | | | |
| 3 | | | | |
| 4 | | | | |
| 5 | | | | |
| 6 | | | | |
| 7 | | | | |
| 8 | | | | |
| 9 | TMXDI | 4 | 45 | Water/methanol, mixture |
| 10 | TMXDI | 3 | 50 | Water/methanol, mixture |
| 11 | TDI | 3 | 35 | Water/methanol, mixture |
| 12 | HMDI | 2 | 50 | water |
| 13 | HMDI | 4 | 50 | water |
| 14 | TDI | 6 | 35 | Water/methanol, mixture |
| 15 | TMXDI | 6 | 50 | Water/methanol, mixture |

[Evaluation Test 1] (Evaluation of Particle Shape)

SEM photographs were taken for particles in EXAMPLES from 9 to 17 and from 20 to 26, where spherical base particles were used, in magnification (from 50 to 10,000 times) sufficient to measure particle diameter. Longest and shortest diameters were measured 15 times randomly per particle and repeated this measurement on n=100 particles to determine average spherical particle index (longest diameter/shortest diameter). Calculation results are shown in Table 5.

TABLE 5

| EXAMPLE | Spherical particle index (longest diameter/shortest diameter) average (a base particle) | Spherical index for a particle with a shell layer (longest diameter/ shortest diameter) average (EXAMPLE) | Spherical degree in EXAMPLE |
|---|---|---|---|
| 9 | 1.03 | 1.04 | ○ |
| 10 | 1.03 | 1.05 | ○ |
| 11 | 1.03 | 1.03 | ○ |
| 12 | 1.05 | 1.05 | ○ |
| 13 | 1.05 | 1.06 | ○ |
| 14 | 1.05 | 1.06 | ○ |
| 15 | 1.07 | 1.07 | ○ |
| 16 | 1.07 | 1.08 | ○ |
| 17 | 1.07 | 1.07 | ○ |
| 20 | 1.03 | 1.04 | ○ |
| 21 | 1.05 | 1.05 | ○ |
| 22 | 1.07 | 1.05 | ○ |
| 23 | 1.03 | 1.04 | ○ |
| 24 | 1.03 | 1.05 | ○ |
| 25 | 1.03 | 1.03 | ○ |
| 26 | 1.03 | 1.03 | ○ |

It was confirmed by the results of Evaluation Test 1 (for particles in EXAMPLES from 9 to 17 and from 20 to 26) that as long as a base particle is spherical particle, particles with a shell layer, which is a layer of a carbodiimide resin formed by bonding, is also a spherical particle.

[Evaluation Test 2] (Evaluation of Particle Average Diameter (L) of a Shell Layer at Particle Surface)

Average particle diameter was determined on a base particle and particles obtained in EXAMPLES and COMPARATIVE EXAMPLES using particle diameter measurement equipment ("Microtrac 9320HRA" from Nikkiso Co.) for non-spherical particles and by SEM photograph for spherical particles on n1=500 particles randomly selected. Average thickness diameter (L) of a shell layer was determined by the following calculation equation. Calculation results are shown in Tables 6 and 7.

Calculation equation of average thickness diameter (L) of a shell layer at particle surface:

$$L = (L_2 - L_1)/2$$

wherein $L_1$ represents average particle diameter of a base particle (particle without the addition of a carbodiimide resin) and $L_2$ represents average particle diameter of a composite particle containing carbodiimide obtained by the addition of a carbodiimide resin.

TABLE 6

| EXAMPLE | EXAMPLE particle Average particle diameter (μm) | Base particle Average particle diameter (μm) | A shell layer Average thickness (μm) |
|---|---|---|---|
| 1 | 12.62 | 12.12 | 0.25 |
| 2 | 14.64 | 12.12 | 1.26 |
| 3 | 14.82 | 12.12 | 1.35 |
| 4 | 14.80 | 14.38 | 0.21 |
| 5 | 16.64 | 14.38 | 1.13 |
| 6 | 14.94 | 14.38 | 0.28 |
| 7 | 48.52 | 48.24 | 0.14 |
| 8 | 49.78 | 48.24 | 0.77 |
| 9 | 2.42 | 1.56 | 0.43 |
| 10 | 2.8 | 1.56 | 0.62 |
| 11 | 2.16 | 1.56 | 0.30 |
| 12 | 6.86 | 5.82 | 0.52 |
| 13 | 7.14 | 5.82 | 0.66 |
| 14 | 6.32 | 5.82 | 0.25 |
| 15 | 14.17 | 12.91 | 0.63 |
| 16 | 14.39 | 12.91 | 0.74 |
| 17 | 13.29 | 12.91 | 0.19 |
| 18 | 14.94 | 12.12 | 1.41 |
| 19 | 18.40 | 14.38 | 2.01 |
| 20 | 3.22 | 1.56 | 0.83 |
| 21 | 7.84 | 5.82 | 1.01 |

TABLE 6-continued

| EXAMPLE | EXAMPLE particle Average particle diameter (μm) | Base particle Average particle diameter (μm) | A shell layer Average thickness (μm) |
|---|---|---|---|
| 22 | 15.35 | 12.91 | 1.22 |
| 23 | 7.41 | 6.83 | 0.29 |
| 24 | 7.67 | 6.83 | 0.42 |
| 25 | 7.31 | 6.83 | 0.24 |
| 26 | 7.93 | 6.83 | 0.55 |

TABLE 7

| COMPARATIVE EXAMPLE | COMPARATIVE EXAMPLE particle Average particle diameter (μm) | Base particle Average particle diameter (μm) | A shell layer Average thickness (μm) |
|---|---|---|---|
| 1 | — | 12.12 | — |
| 2 | — | 14.38 | — |
| 3 | — | 48.24 | — |
| 4 | — | 1.56 | — |
| 5 | — | 5.82 | — |
| 6 | — | 12.91 | — |
| 7 | — | 6.83 | — |
| 8 | — | 4.43 | — |
| 9 | 4.431 | 4.43 | 0.001 |
| 10 | 4.432 | 4.43 | 0.002 |
| 11 | 4.434 | 4.43 | 0.004 |
| 12 | 4.431 | 4.43 | 0.001 |
| 13 | 4.432 | 4.43 | 0.002 |
| 14 | 4.435 | 4.43 | 0.005 |
| 15 | 4.436 | 4.43 | 0.003 |

It was confirmed by the results of Evaluation Test 2 (for particles in EXAMPLES from 1 to 26 and COMPARATIVE EXAMPLES from 1 to 15) that in EXAMPLES particles, a shell layer was formed comprising a carbodiimide resin with thickness in specified range, while in COMPARATIVE EXAMPLES particles, a shell layer was little formed.

[Evaluation Test 3] (Evaluation of Particle Size Distribution)

Particle diameter was determined on a base particle and particles diameter in EXAMPLES from 9 to 17 and from 20 to 26, which were relatively experimentable without modification, by SEM photograph on $n_1$=500 particles randomly selected. CV value of trial prepared spherical particle (a base particle) and CV value of EXAMPLE particles were determined, expressing particle size distribution, CV value (variation degree) defined by the following equation:

$CV$ (%)=(standard deviation/average particle diameter)×100

Variation index (D) defined by the following equation was determined for CV value of each trial prepared spherical particle (a base particle) and CV value of EXAMPLE particle.

Variation index $(D)$=CV value of EXAMPLE particle/CV value of each trial prepared spherical particle (a base particle)

These results are shown in Table 8.

TABLE 8

| EXAMPLE | Base particle Particle size distribution CV value (%) | EXAMPLE particle Particle size distribution CV value (%) | Variation index (D) CV value of EXAMPLE particle/CV value of Base particle |
|---|---|---|---|
| 9 | 4.62 | 4.10 | 0.89 |
| 10 | 4.62 | 4.15 | 0.9 |
| 11 | 4.62 | 4.12 | 0.89 |
| 12 | 7.33 | 7.43 | 1.01 |
| 13 | 7.33 | 7.43 | 1.01 |
| 14 | 7.33 | 7.45 | 1.02 |
| 15 | 14.11 | 14.91 | 1.06 |
| 16 | 14.11 | 15.13 | 1.07 |
| 17 | 14.11 | 14.99 | 1.06 |
| 20 | 4.62 | 4.11 | 0.89 |
| 21 | 7.33 | 7.40 | 1.01 |
| 22 | 14.11 | 14.9 | 1.06 |
| 23 | 5.7 | 5.44 | 0.95 |
| 24 | 5.7 | 5.48 | 0.96 |
| 25 | 5.7 | 5.41 | 0.95 |
| 26 | 5.7 | 5.5 | 0.97 |

It was confirmed by the results of Evaluation Test 3 (for particles in EXAMPLES from 9 to 17 and from 20 to 26) that there was no big change between CV value of a base particle and CV value of an EXAMPLE particle with a shell layer, and particle distribution of an EXAMPLE particle was equivalent to or sharper than that of a base particle, as understood by variation index (D).

[Evaluation Test 4] (Evaluation of Solvent Resistance and Dispersability in a Solvent)

Into a 300 ml flask, each 1 g of each particle in EXAMPLES from 1 to 26 and COMPARATIVE EXAMPLES from 1 to 15 and 100 ml of water or an organic solvent described below were charged, followed by stirring at ambient temperature for 30 minutes and naked eye evaluation of solvent resistance and dispersibility in a solution. Morphology was also observed by SEM (S-2150 from Hitachi Co.). These evaluation results are shown in Table 9.

TABLE 9

| | | Solvents | | | | | | | | | |
|---|---|---|---|---|---|---|---|---|---|---|---|
| | | Water | | Methanol | | Ethanol | | Toruene | | DMF | |
| Evaluation test 4 | | Visual observation | SEM | Visual observation | SEM | Visual observation | SEM | Visual observation | SEM | Visual observation | SEM |
| EXAMPLE | 1 | ○ | 1 | ○ | 1 | ○ | 1 | ○ | 1 | ○ | 1 |
| | 2 | ○ | 1 | ○ | 1 | ○ | 1 | ○ | 1 | ○ | 1 |
| | 3 | ○ | 1 | ○ | 1 | ○ | 1 | ○ | 1 | ○ | 1 |
| | 4 | ○ | 1 | ○ | 1 | ○ | 1 | ○ | 1 | ○ | 1 |
| | 5 | ○ | 1 | ○ | 1 | ○ | 1 | ○ | 1 | ○ | 1 |
| | 6 | ○ | 1 | ○ | 1 | ○ | 1 | ○ | 1 | ○ | 1 |
| | 7 | ○ | 1 | ○ | 1 | ○ | 1 | ○ | 1 | ○ | 1 |
| | 8 | ○ | 1 | ○ | 1 | ○ | 1 | ○ | 1 | ○ | 1 |
| | 9 | ○ | 1 | ○ | 1 | ○ | 1 | ○ | 1 | ○ | 1 |

TABLE 9-continued

|  |  | | | | | | | | | | |
|---|---|---|---|---|---|---|---|---|---|---|---|
|  | 10 | ○ | 1 | ○ | 1 | ○ | 1 | ○ | 1 | ○ | 1 |
|  | 11 | ○ | 1 | ○ | 1 | ○ | 1 | ○ | 1 | ○ | 1 |
|  | 12 | ○ | 1 | ○ | 1 | ○ | 1 | ○ | 1 | ○ | 1 |
|  | 13 | ○ | 1 | ○ | 1 | ○ | 1 | ○ | 1 | ○ | 1 |
|  | 14 | ○ | 1 | ○ | 1 | ○ | 1 | ○ | 1 | ○ | 1 |
|  | 15 | ○ | 1 | ○ | 1 | ○ | 1 | ○ | 1 | ○ | 1 |
|  | 16 | ○ | 1 | ○ | 1 | ○ | 1 | ○ | 1 | ○ | 1 |
|  | 17 | ○ | 1 | ○ | 1 | ○ | 1 | ○ | 1 | ○ | 1 |
|  | 18 | ○ | 1 | ○ | 1 | ○ | 1 | ○ | 1 | x | 0 |
|  | 19 | ○ | 1 | ○ | 1 | ○ | 1 | ○ | 1 | x | 0 |
|  | 20 | ○ | 1 | ○ | 1 | ○ | 1 | Δ | 0 | x | 0 |
|  | 21 | ○ | 1 | ○ | 1 | ○ | 1 | Δ | 0 | x | 0 |
|  | 22 | ○ | 1 | ○ | 1 | ○ | 1 | Δ | 0 | x | 0 |
|  | 23 | ○ | 1 | ○ | 1 | ○ | 1 | x | 0 | x | 0 |
|  | 24 | ○ | 1 | ○ | 1 | ○ | 1 | x | 0 | x | 0 |
|  | 25 | ○ | 1 | ○ | 1 | ○ | 1 | x | 0 | x | 0 |
| Example | 26 | ○ | 1 | ○ | 1 | ○ | 1 | x | 0 | x | 0 |
| COMPARATIVE | 1 | ○ | 1 | x | 0 | x | 0 | ○ | 1 | x | 0 |
| EXAMPLE | 2 | ○ | 1 | x | 0 | x | 0 | ○ | 1 | x | 0 |
|  | 3 | * | * | ○ | 1 | ○ | 1 | ○ | 1 | ○ | 1 |
|  | 4 | ○ | 1 | x | 0 | x | 0 | Δ | 0 | x | 0 |
|  | 5 | ○ | 1 | x | 0 | x | 0 | Δ | 0 | x | 0 |
|  | 6 | ○ | 1 | x | 0 | x | 0 | Δ | 0 | x | 0 |
|  | 7 | ○ | 1 | ○ | 1 | ○ | 1 | x | 0 | x | 0 |
|  | 8 | ○ | 1 | ○ | 1 | ○ | 1 | x | 0 | x | 0 |
|  | 9 | ○ | 1 | ○ | 1 | ○ | 1 | x | 0 | x | 0 |
|  | 10 | ○ | 1 | ○ | 1 | ○ | 1 | x | 0 | x | 0 |
|  | 11 | ○ | 1 | ○ | 1 | ○ | 1 | x | 0 | x | 0 |
|  | 12 | ○ | 1 | ○ | 1 | ○ | 1 | x | 0 | x | 0 |
|  | 13 | ○ | 1 | ○ | 1 | ○ | 1 | x | 0 | x | 0 |
|  | 14 | ○ | 1 | ○ | 1 | ○ | 1 | x | 0 | x | 0 |
| COMPARATIVE EXAMPLE | 15 | ○ | 1 | ○ | 1 | ○ | 1 | x | 0 | x | 0 |

| | | Solvents | | | | | | | | | |
|---|---|---|---|---|---|---|---|---|---|---|---|
| | | THF | | MEK | | NMP | | Acetone | | Dichloromethane | |
| Evalution test 4 | | Visual observation | SEM | Visual observation | SEM | Visual observation | SEM | Visual observation | SEM | Visual observation | SEM |
| EXAMPLE | 1 | ○ | 1 | ○ | 1 | ○ | 1 | ○ | 1 | ○ | 1 |
|  | 2 | ○ | 1 | ○ | 1 | ○ | 1 | ○ | 1 | ○ | 1 |
|  | 3 | ○ | 1 | ○ | 1 | ○ | 1 | ○ | 1 | ○ | 1 |
|  | 4 | ○ | 1 | ○ | 1 | ○ | 1 | ○ | 1 | ○ | 1 |
|  | 5 | ○ | 1 | ○ | 1 | ○ | 1 | ○ | 1 | ○ | 1 |
|  | 6 | ○ | 1 | ○ | 1 | ○ | 1 | ○ | 1 | ○ | 1 |
|  | 7 | ○ | 1 | ○ | 1 | ○ | 1 | ○ | 1 | ○ | 1 |
|  | 8 | ○ | 1 | ○ | 1 | ○ | 1 | ○ | 1 | ○ | 1 |
|  | 9 | ○ | 1 | ○ | 1 | ○ | 1 | ○ | 1 | ○ | 1 |
|  | 10 | ○ | 1 | ○ | 1 | ○ | 1 | ○ | 1 | ○ | 1 |
|  | 11 | ○ | 1 | ○ | 1 | ○ | 1 | ○ | 1 | ○ | 1 |
|  | 12 | ○ | 1 | ○ | 1 | ○ | 1 | ○ | 1 | ○ | 1 |
|  | 13 | ○ | 1 | ○ | 1 | ○ | 1 | ○ | 1 | ○ | 1 |
|  | 14 | ○ | 1 | ○ | 1 | ○ | 1 | ○ | 1 | ○ | 1 |
|  | 15 | ○ | 1 | ○ | 1 | ○ | 1 | ○ | 1 | ○ | 1 |
|  | 16 | ○ | 1 | ○ | 1 | ○ | 1 | ○ | 1 | ○ | 1 |
|  | 17 | ○ | 1 | ○ | 1 | ○ | 1 | ○ | 1 | ○ | 1 |
|  | 18 | x | 0 | x | 0 | x | 0 | x | 0 | ○ | 1 |
|  | 19 | x | 0 | x | 0 | x | 0 | x | 0 | x | 0 |
|  | 20 | x | 0 | x | 0 | x | 0 | x | 0 | x | 0 |
|  | 21 | x | 0 | x | 0 | x | 0 | x | 0 | x | 0 |
|  | 22 | x | 0 | x | 0 | x | 0 | x | 0 | x | 0 |
|  | 23 | x | 0 | x | 0 | x | 0 | x | 0 | x | 0 |
|  | 24 | x | 0 | x | 0 | x | 0 | x | 0 | x | 0 |
|  | 25 | x | 0 | x | 0 | x | 0 | x | 0 | x | 0 |
| Example | 26 | x | 0 | x | 0 | x | 0 | x | 0 | x | 0 |
| COMPARATIVE | 1 | x | 0 | x | 0 | x | 0 | x | 0 | ○ | 1 |
| EXAMPLE | 2 | x | 0 | x | 0 | x | 0 | x | 0 | x | 0 |
|  | 3 | ○ | 1 | ○ | 1 | ○ | 1 | ○ | 1 | ○ | 1 |
|  | 4 | x | 0 | x | 0 | x | 0 | x | 0 | x | 0 |
|  | 5 | x | 0 | x | 0 | x | 0 | x | 0 | x | 0 |
|  | 6 | x | 0 | x | 0 | x | 0 | x | 0 | x | 0 |
|  | 7 | x | 0 | x | 0 | x | 0 | x | 0 | x | 0 |
|  | 8 | x | 0 | x | 0 | x | 0 | x | 0 | x | 0 |
|  | 9 | x | 0 | x | 0 | x | 0 | x | 0 | x | 0 |
|  | 10 | x | 0 | x | 0 | x | 0 | x | 0 | x | 0 |
|  | 11 | x | 0 | x | 0 | x | 0 | x | 0 | x | 0 |
|  | 12 | x | 0 | x | 0 | x | 0 | x | 0 | x | 0 |

TABLE 9-continued

|  |  |  |  |  |  |  |  |  |  |  |  |  |
|---|---|---|---|---|---|---|---|---|---|---|---|---|
|  | 13 | x | 0 | x | 0 | x | 0 | x | 0 | x | 0 | x | 0 |
|  | 14 | x | 0 | x | 0 | x | 0 | x | 0 | x | 0 | x | 0 |
| COMPARATIVE EXAMPLE | 15 | x | 0 | x | 0 | x | 0 | x | 0 | x | 0 | x | 0 | o: Dispersed
Δ: Partly dispersed
x: Dissolved
1: Particle retaining shape of the base particle
0: Particle no longer retaining shape of the base particle
*: Normal temperature o1 heating x0

It can be confirmed by the results of Evaluation Test 4 (for particles in EXAMPLES from 1 to 26 and COMPARATIVE EXAMPLES from 1 to 15) that a composite particle of the present invention was composed of a new bonding group comprising a base particle and a carbodiimide resin and thus provides superior solvent resistance when they are cured (EXAMPLES from 1 to 17) and equivalent or superior performance to COMPARATIVE EXAMPLES particles even in partially cured particles (EXAMPLES from 18 to 26). Dispersibility in a solution was good for water or organic solvents not dissolve these particles.

[Evaluation Test 5] (Evaluation of Heat Resistance)

In an aluminum Petri dish, 1 g of each particle in EXAMPLES from 1 to 26 and COMPARATIVE EXAMPLES from 1 to 15 was charged, followed by curing in a dryer kept at 180° C. for 1 hour and checked residue in the aluminum Petri dish. Particle morphology was confirmed with SEM (S-2150 from Hitachi Co.). These evaluation results are shown in Table 10.

TABLE 10

| Evaluation test 5 | Visual observation | SEM analysis |
|---|---|---|
| EXAMPLE 1 | o | 2 |
| EXAMPLE 2 | o | 2 |
| EXAMPLE 3 | o | 2 |
| EXAMPLE 4 | o | 2 |
| EXAMPLE 5 | o | 2 |
| EXAMPLE 6 | o | 2 |
| EXAMPLE 7 | o | 2 |
| EXAMPLE 8 | o | 2 |
| EXAMPLE 9 | o | 2 |
| EXAMPLE 10 | o | 2 |
| EXAMPLE 11 | o | 2 |
| EXAMPLE 12 | o | 2 |
| EXAMPLE 13 | o | 2 |
| EXAMPLE 14 | o | 2 |
| EXAMPLE 15 | o | 2 |
| EXAMPLE 16 | o | 2 |
| EXAMPLE 17 | o | 2 |
| EXAMPLE 18 | Δ | 1 |
| EXAMPLE 19 | Δ | 1 |
| EXAMPLE 20 | Δ | 1 |
| EXAMPLE 21 | Δ | 1 |
| EXAMPLE 22 | Δ | 1 |
| EXAMPLE 23 | x | 0 |
| EXAMPLE 24 | x | 0 |
| EXAMPLE 25 | x | 0 |
| EXAMPLE 26 | x | 0 |
| COMPARATIVE EXAMPLE 1 | Δ | 1 |
| COMPARATIVE EXAMPLE 2 | x | 0 |
| COMPARATIVE EXAMPLE 3 | o | 2 |
| COMPARATIVE EXAMPLE 4 | x | 0 |
| COMPARATIVE EXAMPLE 5 | x | 0 |
| COMPARATIVE EXAMPLE 6 | x | 0 |
| COMPARATIVE EXAMPLE 7 | x | 0 |
| COMPARATIVE EXAMPLE 8 | x | 0 |
| COMPARATIVE EXAMPLE 9 | x | 0 |
| COMPARATIVE EXAMPLE 10 | x | 0 |
| COMPARATIVE EXAMPLE 11 | x | 0 |
| COMPARATIVE EXAMPLE 12 | x | 0 |
| COMPARATIVE EXAMPLE 13 | x | 0 |
| COMPARATIVE EXAMPLE 14 | x | 0 |
| COMPARATIVE EXAMPLE 15 | x | 0 | o: Particle retaining its shape
Δ: Particle dissolved to some extent
x: Particle dissolved into a plate shape
2: Particle retaining its original shape
1: Particle deformed
0: Particle no longer retaining its particular shape It can be confirmed from the results of Evaluation Test 5 (for particles in EXAMPLES from 1 to 26 and COMPARATIVE EXAMPLES from 1 to 15) that a composite particle of the present invention was composed of a new bonding group comprising a base particle and a carbodiimide resin and thus provides superior heat resistance when they are cured (EXAMPLES from 1 to 17) and equivalent or superior performance to COMPARATIVE EXAMPLE particles even in partially cured state (EXAMPLES from 18 to 26).

[Evaluation Test 6] (Evaluation of Glueability and Tackiness)

Each 5% by weight particle solution was prepared by dispersing 0.5 g of each particle obtained in EXAMPLES from 1 to 26 and COMPARATIVE EXAMPLES from 1 to 15 in 9.5 g of a water/methanol (3:7) solution. Then a slide glass was coated with small amount of the solution, followed by drying in a dryer kept at 80° C. for 1 hour and air blowing (2.0 kgf/cm$^2$) for 10 seconds from 10 cm above the slide glass to evaluate glueability and tackiness by surface observation. These evaluation results are shown in Table 11.

TABLE 11

| Evaluation test 6 | Glueability/tackiness |
|---|---|
| EXAMPLE 1 | □ |
| EXAMPLE 2 | ○ |
| EXAMPLE 3 | ○ |
| EXAMPLE 4 | □ |
| EXAMPLE 5 | ○ |
| EXAMPLE 6 | □ |
| EXAMPLE 7 | □ |
| EXAMPLE 8 | ○ |
| EXAMPLE 9 | ○ |
| EXAMPLE 10 | ○ |
| EXAMPLE 11 | □ |
| EXAMPLE 12 | ○ |
| EXAMPLE 13 | ○ |
| EXAMPLE 14 | □ |
| EXAMPLE 15 | ○ |
| EXAMPLE 16 | ○ |
| EXAMPLE 17 | □ |
| EXAMPLE 18 | ○ |
| EXAMPLE 19 | ○ |
| EXAMPLE 20 | ○ |
| EXAMPLE 21 | ○ |
| EXAMPLE 22 | ○ |
| EXAMPLE 23 | □ |
| EXAMPLE 24 | ○ |
| EXAMPLE 25 | □ |
| EXAMPLE 26 | ○ |
| COMPARATIVE EXAMPLE 1 | X |
| COMPARATIVE EXAMPLE 2 | Δ |
| COMPARATIVE EXAMPLE 3 | X |
| COMPARATIVE EXAMPLE 4 | Δ |
| COMPARATIVE EXAMPLE 5 | X |
| COMPARATIVE EXAMPLE 6 | X |
| COMPARATIVE EXAMPLE 7 | X |
| COMPARATIVE EXAMPLE 8 | X |
| COMPARATIVE EXAMPLE 9 | X |
| COMPARATIVE EXAMPLE 10 | Δ |
| COMPARATIVE EXAMPLE 11 | X |
| COMPARATIVE EXAMPLE 12 | X |
| COMPARATIVE EXAMPLE 13 | Δ |
| COMPARATIVE EXAMPLE 14 | X |
| COMPARATIVE EXAMPLE 15 | Δ |

○: No peeling
□: Partial peeling
Δ: Peeling by half or more
X: Almost whole peeling It can be confirmed from the results of Evaluation Test 6 (for particles in EXAMPLES from 1 to 26 and COMPARATIVE EXAMPLES from 1 to 15) that particles in EXAMPLES from 1 to 26 provide superior glueability and tackiness, while particles in COMPARATIVE EXAMPLES from 1 to 15 do not provide sufficient glueability and tackiness. In particular, use of a carbodiimide resin with relatively high content of carbodiimide groups such as "n" is not less than 10 and high molecular weight, as in Examples from 18 to 22, 24 and 26, can form a shell layer of a carbodiimide resin to sufficiently improve glueability and tackiness even for a base particle with less functional groups contained as long as number of the functional groups are within specified range.

[Evaluation Test 7] (Evaluation of Adhesion and Solvent Resistance)

Each 5% by weight particle solution was prepared by dispersing 0.5 g of each particle obtained in EXAMPLES from 1 to 26 and COMPARATIVE EXAMPLES from 1 to 15 in 9.5 g of a water/methanol (3:7) solution. Then a slide glass, coated beforehand with an amino group containing silane coupling agent (from Corning Co.), was coated with small amount of the solution, followed by drying in a dryer kept at 150° C. for 30 minutes, immersing in a tetrahydrofuran (THF) bath (5 L) for 20 minutes and air drying to evaluate adhesion by observation of slide glass surface. Morphology was re-confirmed with SEM on samples with substances adhered. These evaluation results are shown in Table 12.

TABLE 12

| Evaluation test 7 | Visually observed deposits | SEM analysis |
|---|---|---|
| EXAMPLE 1 | o | Particle retaining its original shape |
| EXAMPLE 2 | o | Particle retaining its original shape |
| EXAMPLE 3 | o | Particle retaining its original shape |
| EXAMPLE 4 | o | Particle retaining its original shape |
| EXAMPLE 5 | o | Particle retaining its original shape |
| EXAMPLE 6 | o | Particle retaining its original shape |
| EXAMPLE 7 | o | Particle retaining its original shape |
| EXAMPLE 8 | o | Particle retaining its original shape |
| EXAMPLE 9 | o | Particle retaining its original shape |
| EXAMPLE 10 | o | Particle retaining its original shape |
| EXAMPLE 11 | o | Particle retaining its original shape |
| EXAMPLE 12 | o | Particle retaining its original shape |
| EXAMPLE 13 | o | Particle retaining its original shape |
| EXAMPLE 14 | o | Particle retaining its original shape |
| EXAMPLE 15 | o | Particle retaining its original shape |
| EXAMPLE 16 | o | Particle retaining its original shape |
| EXAMPLE 17 | o | Particle retaining its original shape |

TABLE 12-continued

| Evaluation test 7 | Visually observed deposits | SEM analysis |
|---|---|---|
| EXAMPLE 18 | o | Deformed particle |
| EXAMPLE 19 | o | Deformed particle |
| EXAMPLE 20 | o | Deformed particle |
| EXAMPLE 21 | o | Deformed particle |
| EXAMPLE 22 | o | Deformed particle |
| EXAMPLE 23 | o | Deformed particle |
| EXAMPLE 24 | o | Deformed particle |
| EXAMPLE 25 | o | Deformed particle |
| EXAMPLE 26 | o | Deformed particle |
| COMPARATIVE EXAMPLE 1 | x | — |
| COMPARATIVE EXAMPLE 2 | x | — |
| COMPARATIVE EXAMPLE 3 | x | — |
| COMPARATIVE EXAMPLE 4 | x | — |
| COMPARATIVE EXAMPLE 5 | x | — |
| COMPARATIVE EXAMPLE 6 | x | — |
| COMPARATIVE EXAMPLE 7 | x | — |
| COMPARATIVE EXAMPLE 8 | x | — |
| COMPARATIVE EXAMPLE 9 | x | — |
| COMPARATIVE EXAMPLE 10 | x | — |
| COMPARATIVE EXAMPLE 11 | Δ | Deformed particle |
| COMPARATIVE EXAMPLE 12 | x | — |
| COMPARATIVE EXAMPLE 13 | x | — |
| COMPARATIVE EXAMPLE 14 | Δ | Deformed particle |
| COMPARATIVE EXAMPLE 15 | x | — |

Visually observed deposits evaluation
o: Deposits observed
Δ: partialy deposits observed
x: No deposits observed (particle dissolved or peeled)

It can be confirmed from the results of Evaluation Test 7 (for particles in EXAMPLES from 1 to 26 and COMPARATIVE EXAMPLES from 1 to 15) that particles in EXAMPLES from 1 to 26 provide superior adhesion and solvent resistance (chemical resistance), while particles in Comparative EXAMPLES from 1 to 15 do not provide sufficient glueability and solvent resistance (chemical resistance).

It is thus clarified by the above-described Evaluation Tests from 1 to 7 on particles in EXAMPLES and COMPARATIVE EXAMPLES, that EXAMPLES from 1 to 26 of the present invention can provide at least one effect among crosslinking, heat resistance, solvent resistance, glueability, adhesion, tackiness and dispersibility in a solvent, as a composite (spherical) particle with a shell layer.

On the other hand, particles in COMPARATIVE EXAMPLES from 1 to 15 do not have effects of heat resistance and solvent resistance, in addition to no effect of a carbodiimide resin itself such as glueability, adhesion and tackiness.

From these results, it is clarified that a composite particle of the present invention provides good crosslinking, heat resistance and solvent resistance due to having a new bonding group comprising a base particle and a carbodiimide resin, and further a particle with a shell layer of a carbodiimide resin layer, is a quite superior composite particle which can provide high glueability, adhesion, tackiness and dispersibility in a solvent.

A composite particle of the present invention is a composite particle comprised of a base particle (A) having a functional group and a shell layer comprised of a carbodiimide resin (B) being formed on a surface layer part thereof, and is characterized in that the base particle (A) and the carbodiimide resin (B) become a bonded particle by a reaction of a functional group of the former with a carbodiimide group of the latter, and the remaining carbodiimide resin forms a shell layer at the particle surface, and therefore it can have excellent performance of resistance to heat and solvents, and further superior glueability, adhesion and tackiness.

As it is a composite particle having such excellent performance, it can be used in wide application fields such as crosslinking agents, stabilizers for improving hydrolysis resistance, curing agents for thermoplastic resins, additives to elastomer, compatibilizers, adhesive agents, coating agents or paints, reinforcing materials or aids for automobile and electric/electronic industries, furniture and building materials, or spacers for liquid crystals, and the like.

What is claimed is:

1. A composite particle made from a base particle (A) and a carbodiimide resin (B), wherein
said base particle (A) has a functional group reactable with a carbodiimide group and said carbodiimide resin (B) contains a carbodiimide group and
said base particle (A) and said carbodiimide resin (B) are bonded together by the functional group of the base particle (A) and the carbodiimide group of the carbodiimide resin (B) to form a shell layer comprised of the carbodiimide resin (B) having average thickness diameter (L), represented by the following numerical equation [1], in the range of 0.01 to 20 μm:

$$L=(L_2-L_1)/2 \quad [1]$$

wherein $L_1$ represents average particle diameter of the base particle and $L_2$ represents average particle diameter of the composite particle.

2. The composite particle according to claim 1, characterized in that morphology of the base particle (A) is true spherical or near spherical.

3. The composite particle according to claim 1, characterized in that at least one carbodiimide group in a molecular chain of the carbodiimide resin (B) bonds with the functional group of the base particle (A) to form the shell layer.

4. The composite particle according to claim 1, characterized in that the bond of the functional group of the base particle (A) and the carbodiimide group of the carbodiimide resin (B) is at least one kind selected from a carbamoyl amide bond, an isourea bond, a guanidine bond or a thiourea bond.

5. The composite particle according to claim 1, characterized in that the functional group of the base particle (A) is at least one active hydrogen group selected from a hydroxyl group, a carboxyl group, an amino group or a thiol group.

6. The composite particle according to claim 1, characterized in that the base particle (A) is a thermoplastic resin particle.

7. The composite particle according to claim 1, characterized in that the carbodiimide resin (B) is a carbodiimide resin represented by the following chemical formula (1):

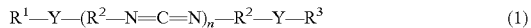

$$R^1\text{—}Y\text{—}(R^2\text{—}N\text{=}C\text{=}N)_n\text{—}R^2\text{—}Y\text{—}R^3 \quad (1)$$

wherein $R^1$ and $R^3$ represent hydrogen or an organic residue having a carbon number of 1 to 40, which is obtained from a compound having a functional group reactable with an isocyanate group left by the functional group, and may be the same or different, and $R^2$ represents an organic residue which is a diisocyanate left by the isocyanate group, wherein said diisocyanate may be a different type; Y represents a bond formed by the isocyanate group and the functional group reactable with the isocyanate group, and "n" is average degree of polymerization, being in the range of 1 to 100; $R^1$—Y and Y—$R^3$ may be an isocyanate group itself on the way to carbodiimidation.

8. The composite particle according to claim 7, characterized in that the carbodiimide resin (B) has at least one kind of a hydrophilic segment, and is water-soluble.

9. A method for producing the composite particle according to any one of claims 1 to 8, comprising
a first step wherein a base particle (A) having a functional group reactable with a carbodiimide group and a carbodiimide resin (B) are mixed or immersed in the presence of at least one kind of a solvent selected from an organic solvent or water which is a non-solvent of the base particle (A) but a solvent of the carbodiimide resin (B), to sufficient degree that the carbodiimide resin (B) is impregnated at a surface layer part of the base particle (A), and consecutively a second step wherein at the surface of the base particle (A), a shell layer which is comprised of the carbodiimide resin (B) is formed so as to cover the base particle (A), by a reaction of a functional group of the base particle (A) with a carbodiimide group of the carbodiimide resin (B).

10. The method for producing the composite particle according to claim 9, further comprising a preliminary step of forming said base particle (A) by suspension polymerization, emulsion polymerization, dispersion polymerization or seed polymerization.

11. The method for producing the composite particle according to claim 9, wherein in the first step the base particle (A) is immersed in a solution which is obtained by dissolving the carbodiimide resin (B) in at least one kind of a solvent selected from an organic solvent or water.

* * * * *